United States Patent [19]

Hirschfeld et al.

[11] Patent Number: 4,903,815

[45] Date of Patent: Feb. 27, 1990

[54] AUTOMATIC VENDING MACHINE AND SYSTEM FOR DISPENSING ARTICLES

[75] Inventors: Gidoon Hirschfeld; Abraham Shotland, both of Ein Harod Meuhad, Israel

[73] Assignee: I.V.D.M. Ltd., Ein Harod Meuhad, Israel

[21] Appl. No.: 173,717

[22] Filed: Mar. 25, 1988

[51] Int. Cl.[4] .......... G07F 7/06; B65G 1/06

[52] U.S. Cl. .......... 194/205; 221/21; 221/88; 414/273; 414/280; 414/661

[58] Field of Search .......... 194/205, 350; 221/4, 221/21, 79, 88, 134, 156, 220, 243, DIG. 1; 414/273, 274, 275, 277, 280, 281, 282, 283, 659, 660, 661, 662, 663; 235/380, 381; 186/55, 56; 901/13, 32, 39, 44, 45, 46, 47, 49

[56] References Cited

U.S. PATENT DOCUMENTS

| | | | |
|---|---|---|---|
| 3,372,816 | 3/1968 | Atwater | 414/277 X |
| 3,964,577 | 6/1976 | Bengtsson | 186/56 X |
| 4,348,152 | 9/1982 | Takamatsu | 414/273 X |
| 4,389,157 | 6/1983 | Bernard et al. | 414/280 X |
| 4,563,120 | 1/1986 | Josserand | 414/273 |
| 4,573,271 | 3/1986 | Hamilton et al. | 901/45 X |
| 4,598,810 | 7/1986 | Shore et al. | 221/88 X |
| 4,668,150 | 5/1987 | Blumberg | 221/88 X |
| 4,734,005 | 3/1988 | Blumberg | 221/88 X |

FOREIGN PATENT DOCUMENTS

| | | | |
|---|---|---|---|
| 0184527 | 6/1986 | European Pat. Off. | 194/205 |
| 0191636 | 8/1986 | European Pat. Off. | 194/205 |
| 0249367 | 12/1987 | European Pat. Off. | 194/205 |
| 8602758 | 5/1986 | Int'l Pat. Institute | 221/88 |
| 8606050 | 10/1986 | Int'l Pat. Institute | 414/273 |

*Primary Examiner*—Joseph J. Rolla
*Assistant Examiner*—Edward S. Ammeen
*Attorney, Agent, or Firm*—Fleit, Jacobson, Cohn, Price, Holman & Stern

[57] ABSTRACT

An article gripper is moved by a robotic transporter in two perpendicular directions within a transport plane between a reference location and ID code reading locations aligned with an access port and storage cells of storage assemblies mounted in doors closing a transport compartment of an automatic vending machine. The gripper is also moved by the robotic transporter in a direction intersecting the transport plane to insert or withdraw articles carried by the gripper after displacement by incremental amounts from the aligned reading locations to gripping or releasing positions. The foregoing movements of the gripper as well as other related operations are under programmed control of a computer and inputted data from a keypad and card reader to perform merchandising transactions with respect to manufactured articles stored in the doors of the machine as well as to accommodate servicing operations.

27 Claims, 21 Drawing Sheets

FIG. 1
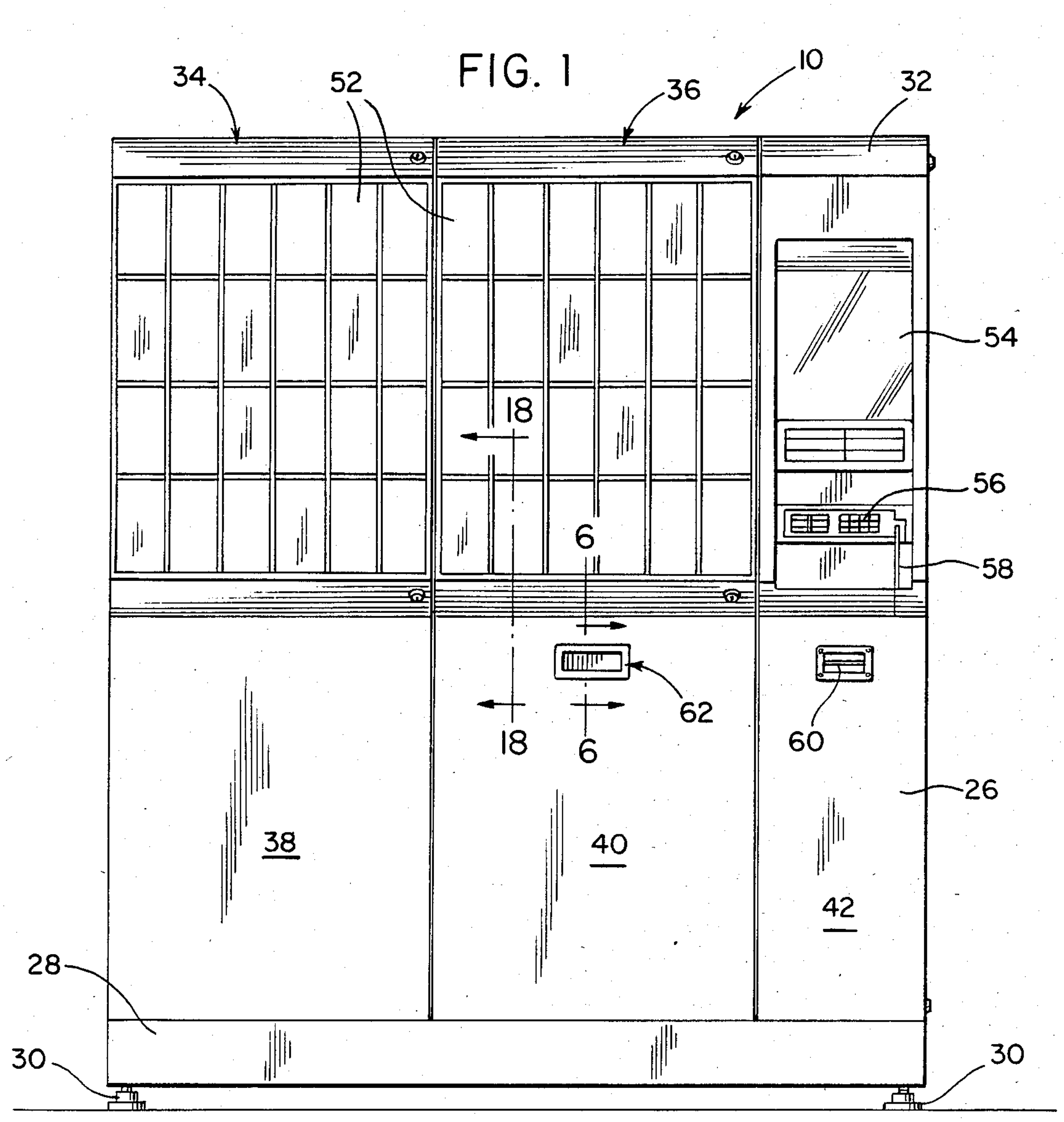
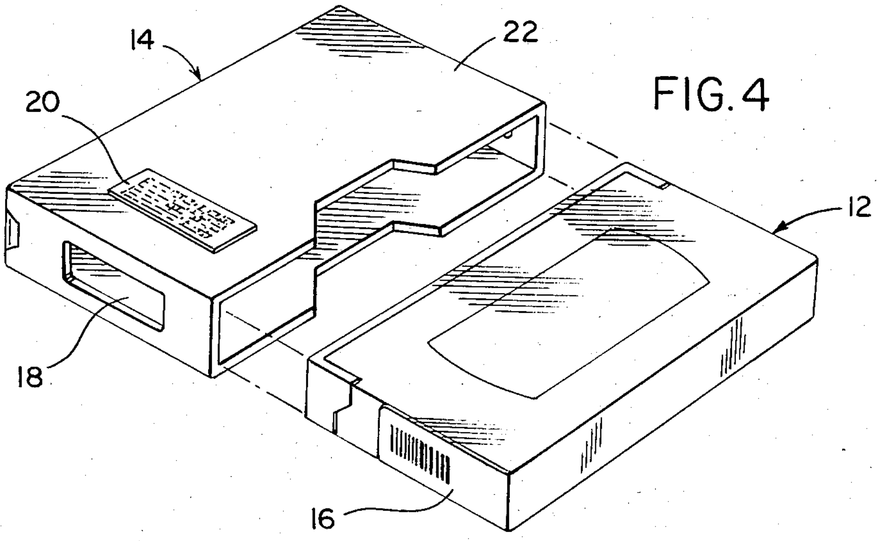
FIG. 4

AUTOMATIC VENDING MACHINE AND SYSTEM FOR DISPENSING ARTICLES

BACKGROUND OF THE INVENTION

This invention relates generally to the merchandising of manufactured articles or products and more particularly to a vending machine and an associated product merchandising system.

Automatic vending machines within which manufactured articles or products are stored and dispensed therefrom to customers in response to coded inputs from a keypad after the machine is enabled by insert of a coin or token, are already well known. The dispensing of articles together with the reception of articles in the form of paper currency and bank deposits, respectively, is also well known in the art in connection with automatic teller machines presently in wide-spread use. Such automatic teller machines also involve the recording of transactions, the updating of computer memories, the issuing of receipts, the operation of visual monitors to provide user instruction, as well as other related banking functions.

The use of the attributes of the automatic teller machines in combination with automatic product vending operations for merchandising of manufactured articles such as video recorder cassettes has already been proposed and commercialized to a limited degree, involving the use of automatic vending machines with control systems enabled through credit card validation operations. Such prior vending machines and associated operational controls have suffered from various problems in attempting to adapt existing computer technology and automated vending equipment to the merchandising of manufactured products such as video cassettes. Such problems involve, for example, operational reliability and efficiency, servicing facility and transaction security.

It is therefore an important object of the present invention to provide a manufactured article merchandising machine and system through which rental, purchase and article return transactions may be automatically performed together with related transaction accounting operations based on validated customer credit status.

It is an additional important object of the present invention, in accordance with the foregoing object to perform the various merchandising and related functions in a more efficient and reliable manner than was heretofore possible based on existing and known technologies.

SUMMARY OF THE INVENTION

In accordance with the present invention, an automatic vending type of machine is provided having a cabinet enclosing at one end a control compartment closed by a panel assembly mounting a visual display monitor, a keypad, a magnetic card reading slot and a receipt issuing port. The machine cabinet also encloses a relatively large transport compartment closed by at least two door assemblies within which a plurality of storage cells are mounted. One of the door assemblies also mounts an article access port unit through which articles are inserted and withdrawn from the machine. The access port unit extends through the storage assembly associated with its mounting door and projects into the transport compartment within which a robotic transporter is mounted. The robotic transporter is operative under programmed computer control to transport articles between a reference location in a transport plane spaced from the storage cells and a plurality of locations in such plane aligned with the storage cells and the access port. The storage assembly includes at least one storage cell which serves to realign misaligned articles carried by a gripper device during transport by the robotic transporter. The storage assembly also provides separate space for receiving articles to be discarded or removed from the merchandising process. Thus, the article gripper device associated with the robotic transporter travels in horizontal and vertical directions perpendicular to each other within the transport plane, between the access port location, the locations aligned with the storage cells, the realignment location and the article discard location. The robotic transporter includes screw and nut drives for effecting linear movement of the article gripper in the aforementioned horizontal and vertical transport directions. The gripper is also moved in a third direction intersecting the transport plane at one of the aligned locations to which it travels from the reference location in order to insert or withdraw an article with respect to a storage cell, the realignment zone or the access port. Such insertion or withdrawal movement of the gripper is effected by a third linear screw and nut drive of the robotic transporter.

A frictional drive device is associated with the access port unit for displacing the article received therein to a position projecting into the transport compartment for code reading purposes. In the case of a video cassette, the article is retained within a holder box having openings through which an identification bar code is exposed to a bar code scanner mounted on the gripper. The top surface of the holder mounts an additional coded strip to be read by an optical scanner directly mounted on the access port unit. The bar code scanner on the gripper is adapted to be aligned with the bar code location on the article projecting into the travel compartment when the gripper is moved to one of the aligned storage locations as aforementioned. Various code reading functions may thereby be performed in accordance with the computer control program which also dictates other robotic transporter movements. The gripper is thus displaceable vertically by the robotic transporter a small incremental amount from the reading position in order to align a lower fixed gripper jaw with the selected storage zone or access port unit while the gripper is open. The gripper is then horizontally displaced by the robotic transporter an incremental distance toward the storage assembly from the transport plane so that the article projecting therefrom may be clamped to the gripper upon closing of its upper movable jaw in order to withdraw an article from a selected storage zone or the access port. The gripper opening and closing sequence is reversed when inserting an article into an empty storage zone or access port. During movement of the gripper toward the storage assembly, the bar code scanner aforementioned is withdrawn from its reading position.

The screw and nut drive for imparting movement to the gripper in the insert/withdrawal direction is coupled to the gripper through a lost-motion connection established by a collision signalling device, by means of which a signal is generated whenever excessive resistance to movement is experienced by the gripper as a result of collision error. Such collision signal is operative to effect programmed transport of an article carried by the gripper to the aligning location and insertion of the article into the alignment cell followed by transport of the article to another storage zone. If a collision signal is again generated during an attempted insertion of the article into the other storage zone, computer programmed operation initiates transport of the article by the robotic transporter to the disposal zone of the storage assembly for discarding the article therein.

The computer controlled operation of the machine is also programmed in accordance with service modes for loading and unloading of articles in the storage assemblies, repair of the machine and replacement of components therein. The mounting of the storage assemblies in the doors of the machine provides easy access for repair and servicing of the robotic transporter as well as for article loading and unloading purposes. The aforementioned incremental movements of the gripper for scanner reading, gripping and release of articles, enables the efficient use of soft strip coded labels on the article thereby reducing memory loading of the process controlling computer in view of the storage of data on the coded labels.

The process or operations controller is in the form of a local computer having facilities for intercommunication with a central host computer whereby the machine may be operated as part of a network system. Programmed control of door locks associated with door assemblies provides security for the machines as well as to limit the servicing of the machines to validated personnel through use of magnetically coded service identification cards read by the same magnetic reader of the machine which reads credit cards of customers.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

FIG. 1 is a front elevation view of an article merchandising machine constructed in accordance with one embodiment of the present invention.

FIG. 4 is a perspective view of a typical video recorder cartridge and a holder box to be utilized in connection with the machine shown in FIGS. 1-3.

DETAILED DESCRIPTION OF PREFERRED EMBODIMENT

Figure 2:
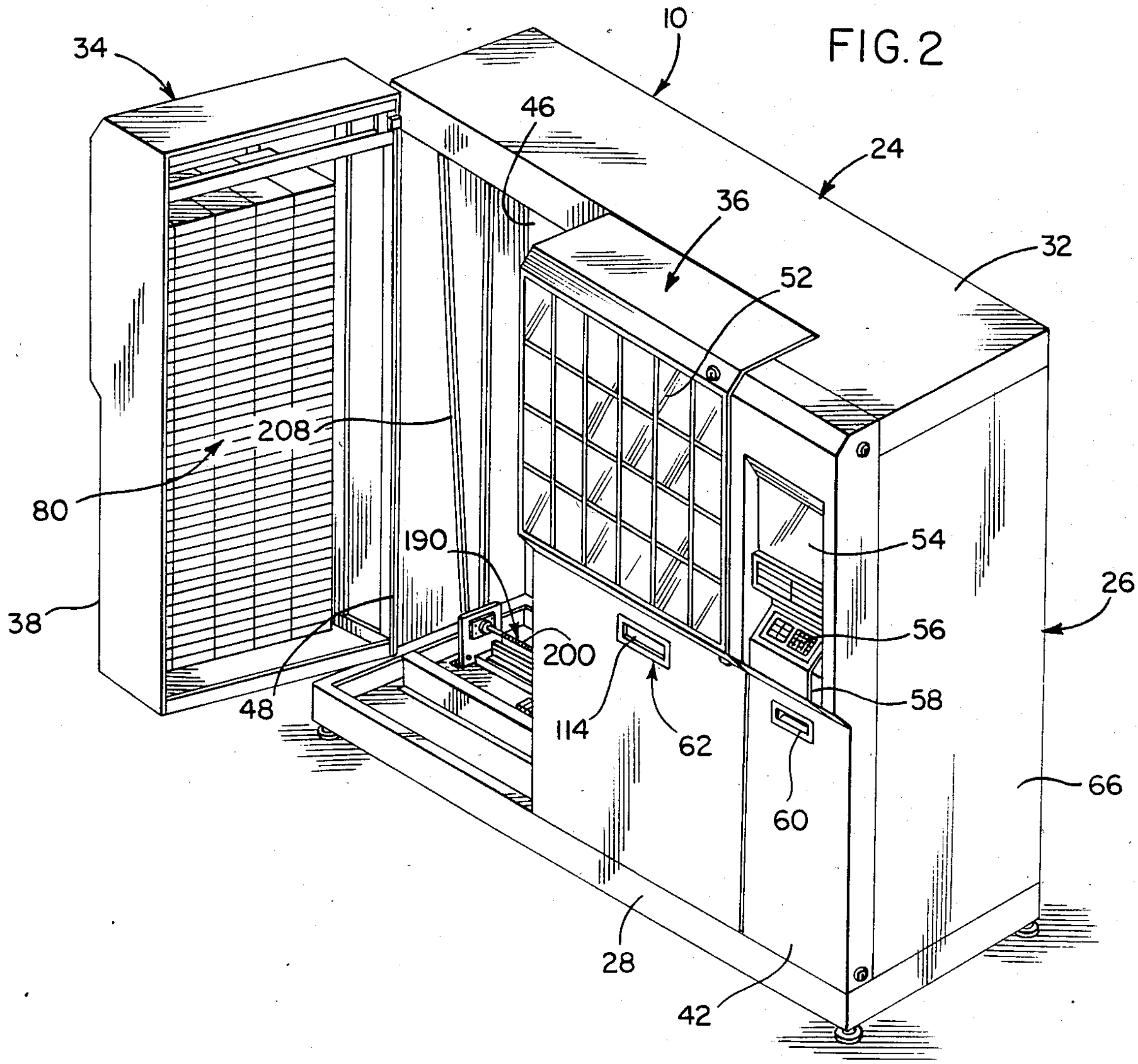
FIG. 2 is a perspective view showing the machine of FIG. 1 with one of the door assemblies thereof in an open position.
Figure 3:
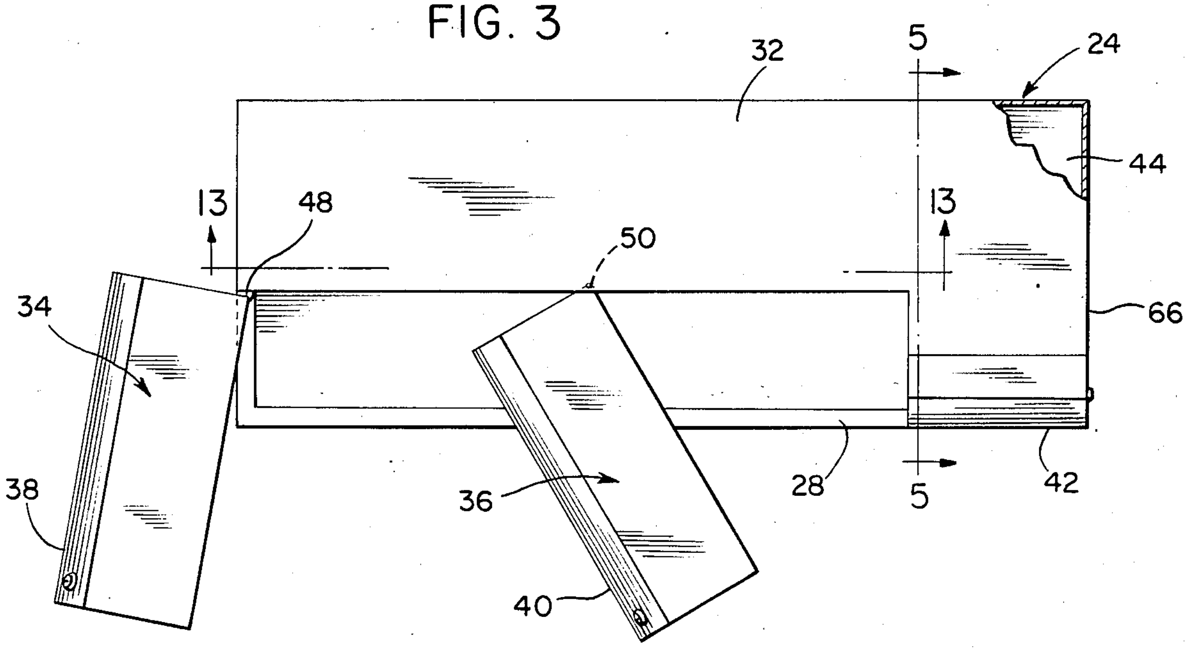
FIG. 3 is a top plan view of the machine shown in FIGS. 1 and 2 with both of the door assemblies thereof in open positions.

Referring now to the drawings in detail, FIGS. 1, 2 and 3 illustrate a dispensing machine generally referred to by reference numeral 10 adapted to handle transactions involving video recording cassettes as the merchandising article in accordance with one embodiment of the invention. A typical video cassette 12 as shown in FIG. 4, is to be merchandised through machine 10 while retained within a holder or handling box 14. In the illustrated embodiment, the video cassette 12 has scanner readable identification data in the form of a bar code on strips 16 adhesively attached to opposite longitudinal ends of the cassette housing extending from one elongated side as shown. The bar codes on strips 16 are exposed through openings 18 in the ends of the holder 14 which also has a soft strip 20 adhesively attached to the top thereof with optically readable data imprinted thereon to provide detailed information regarding the article or cassette 12 carried in the holder. The holder is made of a suitable plastic material having a friction surface portion 22 through which the holder is displaced by frictional drive as will be described hereinafter.

The machine 10 has an outer cabinet structure generally referred to by reference numeral 24 formed by an intermediate housing portion 26 supported on a base portion 28 having level adjusted feet 30 as shown in FIG. 1. The top of the cabinet structure is closed by a roof portion 32. While the base portion 28 is substantially rectangular, the top portion 32 is generally L-shaped to accommodate two door assemblies 34 and 36. In the closed positions of the door assemblies, the front door panels 38 and 40 thereof are substantially flush with the front panel 42 closing a control compartment 44 on the right side within the cabinet as viewed in FIG. 3. The door assemblies 34 and 36, themselves substantially seal a common travel or transport compartment 46 within the cabinet as indicated in FIG. 2. The left hand door assembly 34 is pivotally mounted by a hinge 48 on the left end of the intermediate housing portion of the cabinet while the door 36 is pivotally mounted by the base and roof portions 28 and 32 of the cabinet along hinge axis 50 so that both door assemblies swing open in clockwise directions as shown in FIG. 3 to expose the travel compartment 46 for servicing purposes.

The front panels 38 and 40 of the door assemblies have forwardly projecting sections mounting a plurality of posters 52 displaying information on the contents of the video cassettes available for rental or purchase. The front panel 42 closing the control compartment 44 at the right side of the cabinet mounts the screen of a visual display monitor 54 through which instructional data and other information is displayed to the user or servicing personnel. A keypad 56 is disposed below the visual display 54 for entry of operational mode selection data. Machine enabling inputs are entered by insertion into a vertical slot 58 of credit or service identification cards containing magnetically readable validating data. A printed receipt delivery port 60 is mounted on the panel 42 below the keypad 56 and card slot 58. A cassette access port unit 62 is mounted on the front panel 40 of the door assembly 36 below the selection display posters 52.

Figure 5:
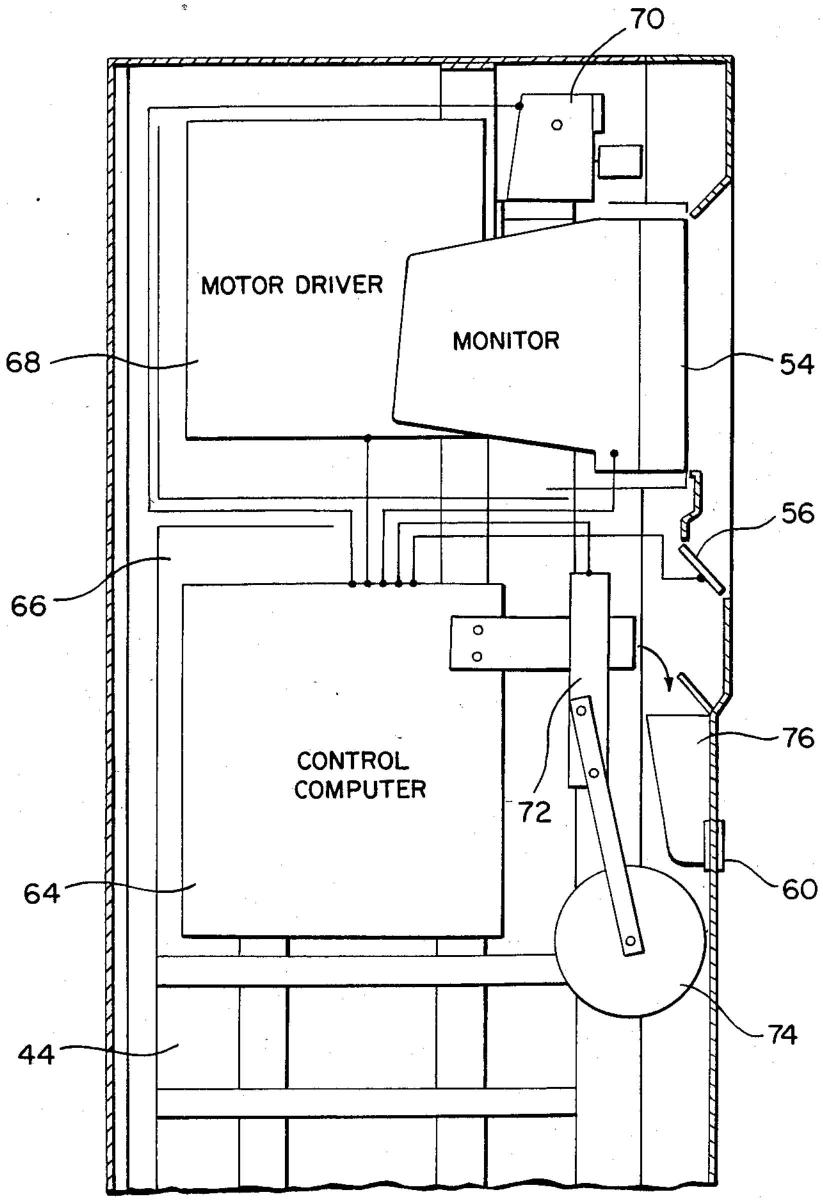
FIG. 5 is a partial side section view taken substantially through a plane indicated by section line 5—5 in FIG. 3.

Referring now to FIG. 5, the control compartment 44 of the cabinet encloses the visual display monitor 54 which is electronically connected to a local computer 64 of an IBM PC XT compatible type having a hard disc memory of large capacity and facilities for intercommunication with other computers. The keypad 56 aforementioned is connected to the computer 64. Also mounted within the control compartment on the end wall 66 of the cabinet above the computer 64 is a motor controller circuit assembly 68 to which the computer is electrically connected. The local computer 64 is furthermore connected to a journal printer 70 located above the display monitor 54 and a receipt printer 72 located therebelow. The printer 70 records transactions performed by the machine 10 when operated independently of any centrally controlled network of machines so that its transaction recordings may be periodically removed therefrom by servicing personnel. A paper roll 74 is supported below printer 72 to supply a strip of paper fed to the printer 72 on which transaction receipts are imprinted under control of the computer 64. Severed print-out receipts ejected from printer 72 are deposited into a drop chute 76 terminated at its lower end by the receipt delivery port 60 aforementioned.

Figure 6:
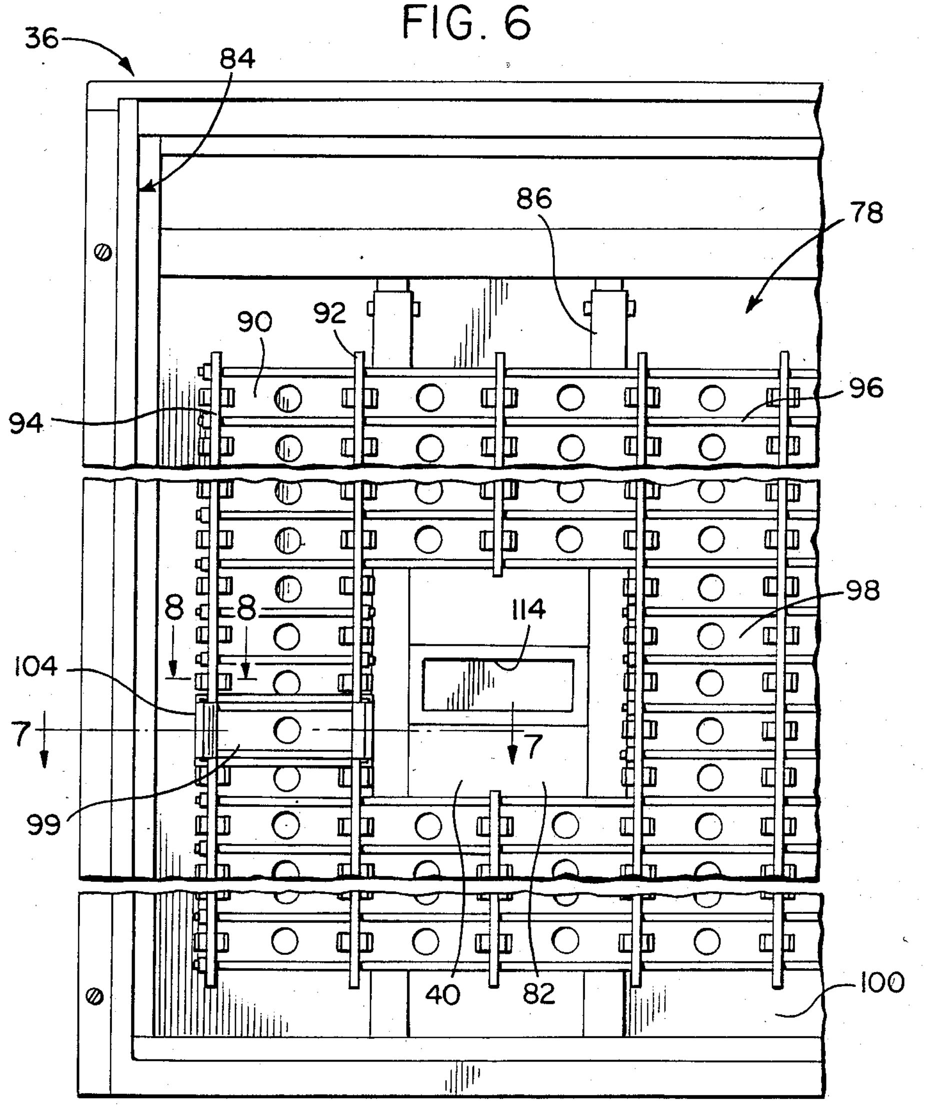
FIG. 6 is a partial section taken substantially through a plane indicated by section line 6—6 in FIG. 3 with the access port unit removed.
Figure 7:
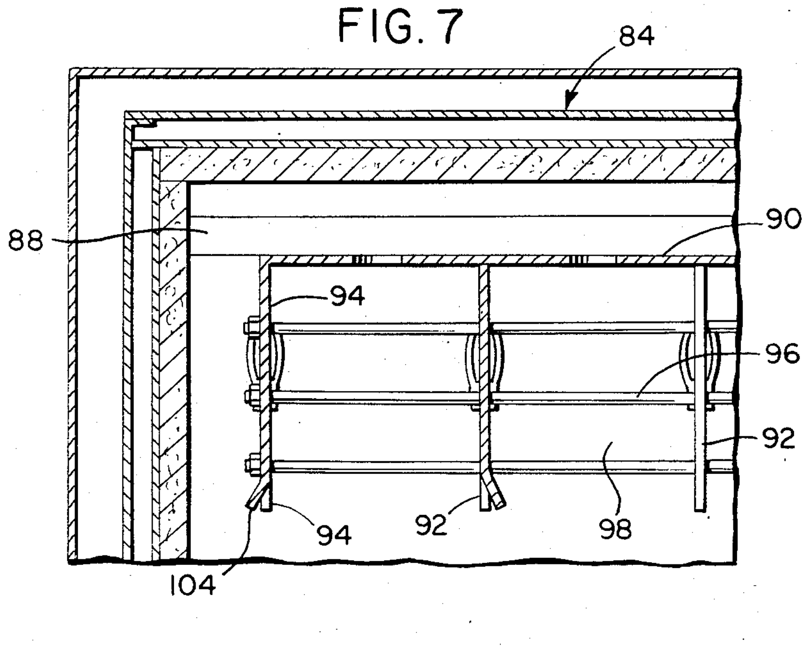
FIG. 7 is a partial section taken substantially through a plane indicated by section line 7—7 in FIG. 6.

The article access port unit 62, hereinbefore referred to, projects inwardly from the front panel 40 of the door assembly 36 through one of two cassette storage assemblies 78 as shown in FIG. 6. The storage assembly 78 mounted on the inside of door assembly 36 is similar to the storage assembly 80 mounted in the other door 34 as shown in FIG. 2, except for an opening 82 in the storage assembly 78 through which the port unit 62 (omitted from FIG. 6) extends from the front door panel 40. The storage assembly 78 includes a frame 84 peripherally secured to the door panel 40, the frame including a pair of vertical posts 86 exposed within opening 82 as shown in FIG. 6 for support of port unit 62 as will be described hereinafter. Horizontal frame members 88 of the storage frame 84, as shown in FIG. 7, have attached thereto a back panel 90 from which storage partition walls 92 project in parallel spaced relation to side walls 94. Thus, the partition walls 92 divide the storage assembly into vertical spaces which open into the transport compartment 46 when the door is closed. Such vertical spaces are horizontally divided into storage cells or zones 98 by support rods 96 which extend between the side walls 94 and through the partition walls 92. Inventoried cassettes are thereby supported within the storage zones 98 as the articles being stored in the cabinet. The side walls 94 and partition walls 92 terminate at their lower ends in spaced relation to the lower end of the frame 84 so as to form a cassette disposal zone 100 into which cassettes are discarded.

Figure 8:
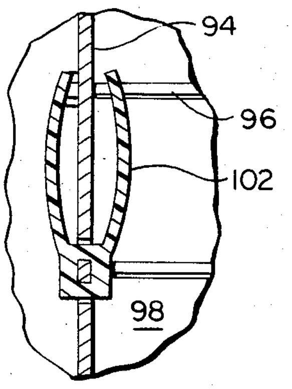
FIG. 8 is an enlarged partial section view taken substantially through a plane indicated by section line 8—8 in FIG. 6.

Each storage zone 98 is provided with flexible elements 102 anchored to the partition walls 92 and side walls 94 as more clearly seen in FIG. 8. Such elements 102 wipingly contact the sides of the cassette holders 14 through which the cassettes are stored in the storage zones, in order to yieldably maintain proper orientation of each holder while supported in a storage zone on the rods 96.

One of the storage zones 99 formed between side wall 94 and the adjacent partition wall 92, has outwardly diverging flanges 104 as shown in FIGS. 6 and 7 in order to engage a misaligned cassette holder inserted into such zone. Such realigning action of the flanges 104 restores the cassette holder to its proper orientation for subsequent insertion into another storage zone 98 as will be described hereinafter. The storage zone 99 with which flanges 104 are associated, is used only for realigning purposes.

Figure 11:
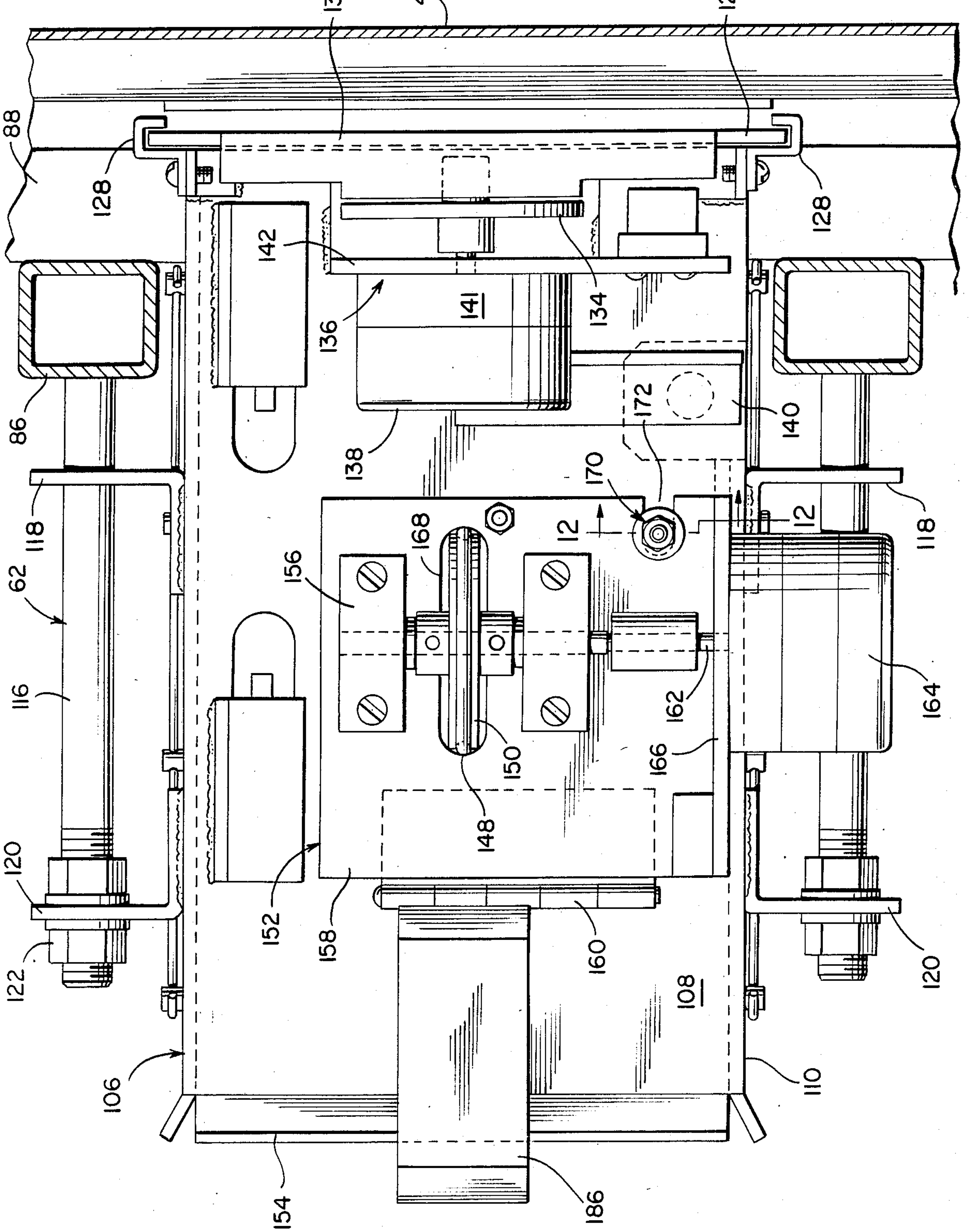
FIG. 11 is a partial section view taken substantially through a plane indicated by section line 11—11 in FIG. 9.

The storage assembly 78 described with respect to FIGS. 6, 7 and 8 is the same as the storage assembly 80 in door 34 except for the opening 82 as aforementioned. The opening 82 is occupied by the port unit 62 as shown in FIGS. 9–12. The port unit includes an elongated guide member 106 having an inverted U-shaped cross-section formed by a top wall 108 and parallel spaced side walls 110 depending therefrom. The guide member is adjustably positioned with one end 112 in alignment with the frame port opening 114 in the door panel 40 by support rods 116 extending rearwardly from the vertical frame posts 86 of the storage assembly 78 hereinbefore described. The support rods 116 project through openings in brackets 118 and 120 secured to the side walls 110 of the guide member 106. Lock nuts 122 are threadedly mounted on the end portions of the support rods 116 for locking the guide member in its adjusted position as shown in FIG. 11.

Figure 9:
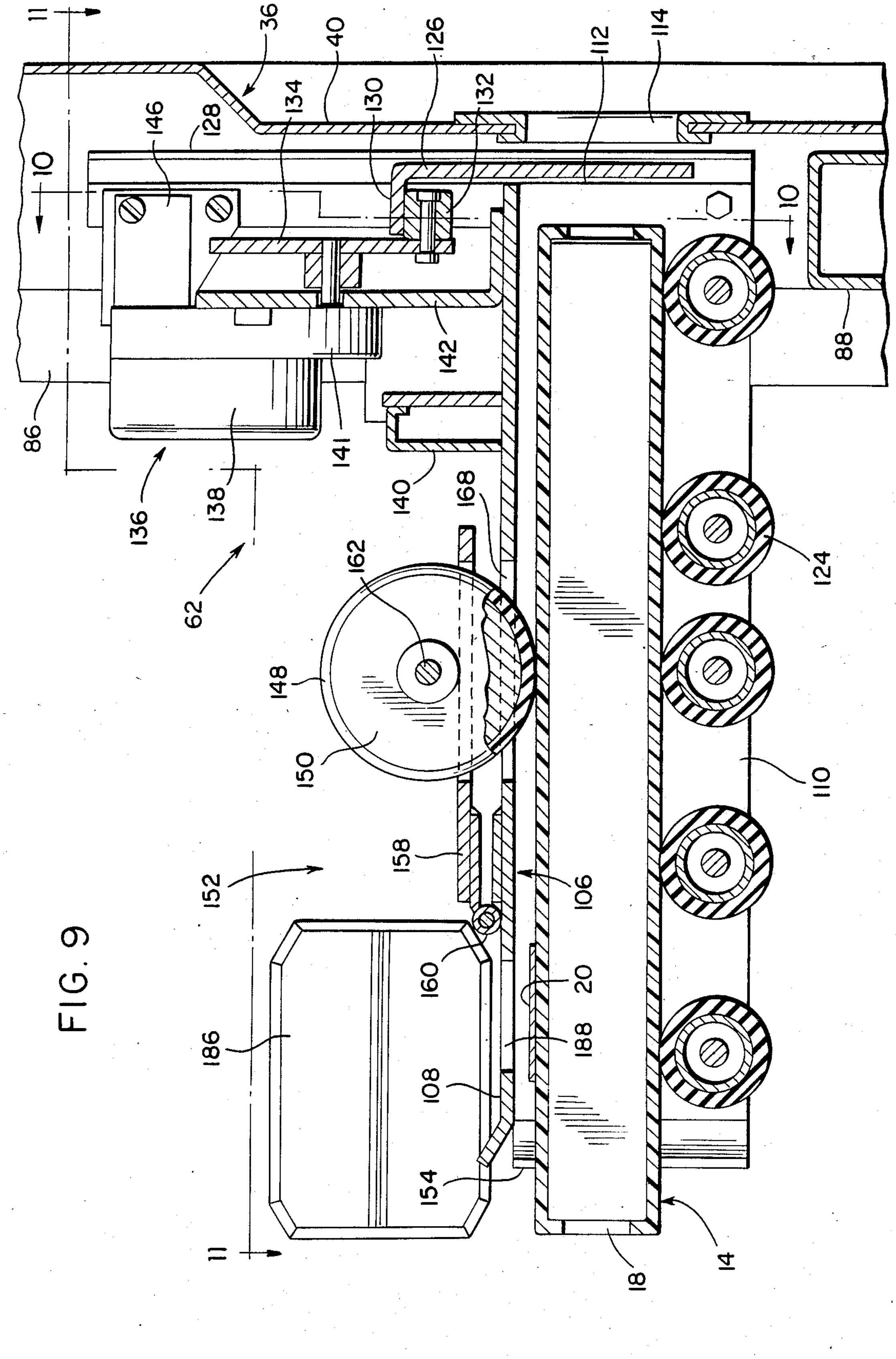
FIG. 9 is an enlarged partial section view taken substantially through a plane indicated by section line 9—9 in FIG. 1.
Figure 10:
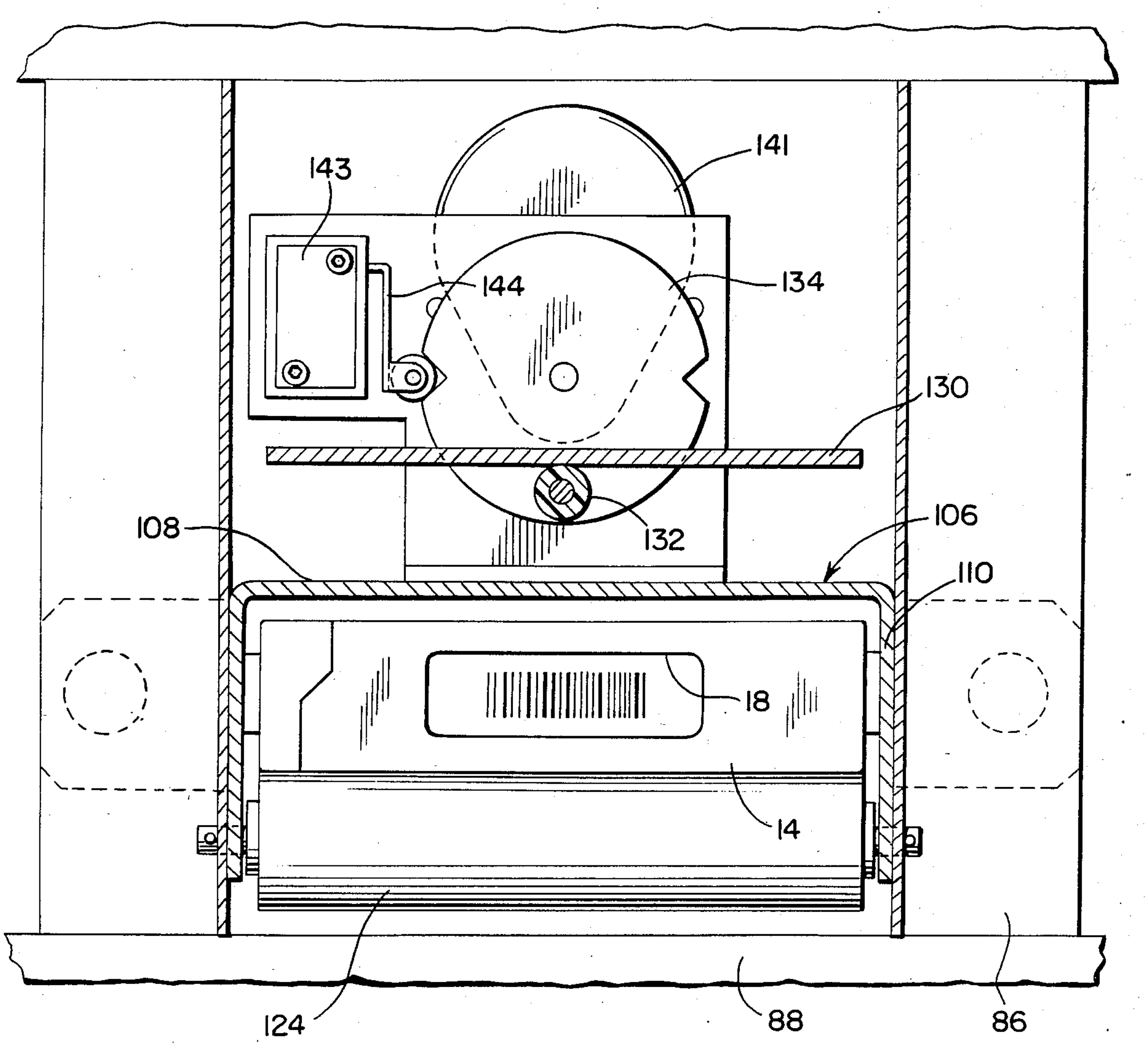
FIG. 10 is a partial section view taken substantially through a plane indicated by section line 10—10 in FIG. 9.

A plurality of guide rollers 124 are rotatably mounted between the side walls 110 of the guide member 106 and are spaced below the top wall 108 thereof for guiding support of a cassette holder 14 during reception or withdrawal as shown in FIG. 9. The end 112 cf the guide member aligned with the port opening 114 in the door panel is adapted to be closed or blocked by a shutter element 126 that is slidably mounted, for vertical displacement, by a pair of track members 128 secured to the guide member 106 at its end 112. A flange 130 projects rearwardly from the shutter element above the top wall of the guide member for engagement by a roller 132 mounted on a notched disc 134 of a shutter actuator mechanism generally referred to by reference numeral 136. The actuator mechanism includes a drive motor 138 and associated reduction gear 141 mounted on a support bracket 142 secured to the top wall 108 of the guide member adjacent to end 112. A motor control box 140 is wired to the drive motor 138, the operation of which is controlled through a motion control switch 143 having a switch actuator arm 144 engaged with the rim of the disc 134 as more clearly seen in FIG. 10. Thus, the shutter 126 is vertically displaced between its closed position as shown in FIG. 9 and an upwardly displaced open position by programmed control of the drive motor 138 as will be described in detail hereinafter. A limit switch 146 is associated with the drive motor 138 for that purpose as shown in FIG. 9.

When the shutter 126 is opened, a cassette holder 14 may be inserted into the guide member of the port unit 62 so that it rests on the guide rollers 124 while engaged by the frictional rim 148 of a drive wheel 150 forming part of a frictional drive engaging mechanism 152 associated with the port unit 62. The cassette holder 14 is thereby displaced from a position assumed when inserted, to a data reading position projecting rearwardly from the flanged end portion 154 of the guide member into the travel compartment 46 of the cabinet as shown in FIG. 9. The drive wheel 150 is rotatably mounted by bearing assemblies 156 on a support plate 158 pivotally mounted on the top 108 of the guide member 106 by means of a hinge 160 as shown in FIGS. 9 and 11. A power shaft 162 extends from the drive wheel to a drive motor 164 mounted on a support flange 166. Thus, the drive wheel 150 projecting through a slot 168 in the top wall 108 of the guide member 106 is held in frictional contact with the surface portion 22 of the holder 14 under the bias of gravity and a hold-down spring device 170 projecting through a slot 172 in the edge of the hinged support plate 158.

Figure 12:
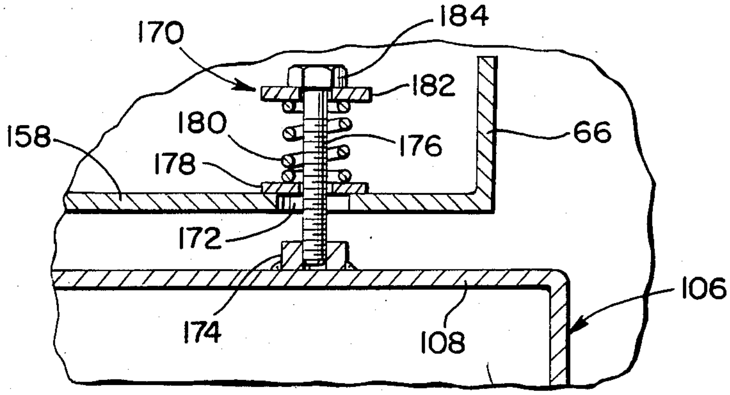
FIG. 12 is an enlarged partial section view taken substantially through a plane indicated by section line 12—12 in FIG. 11.

The hold-down spring device 170 as shown in FIG. 12 includes a nut 174 fixed to the top wall of the guide member 106 for threadedly anchoring a bolt 176 projecting upwardly through slot 172. Washer 178 abutting the support plate 158 and bridging the slot 172 is engaged by one axial end of a coil spring 180 encircling the bolt 176. The other axial end of spring 180 engages a washer 182 underlying the head 184 of the bolt to thereby exert a predetermined downward spring bias on the plate 158 to provide the proper frictional drive contact pressure as well as to accommodate upward retraction of the drive wheel when a cassette holder 14 is inserted.

As shown in FIGS. 9 and 11, an optical reader 186 is mounted in alignment with an opening 188 in the top wall 108 of the guide member through which the coded soft strip 20 on the cassette holder is exposed while the holder is in reading position. Optical reading of the soft strip 20 thereby provides additional input data to the system with which the machine 10 is associated as will be explained hereinafter.

Figure 13:
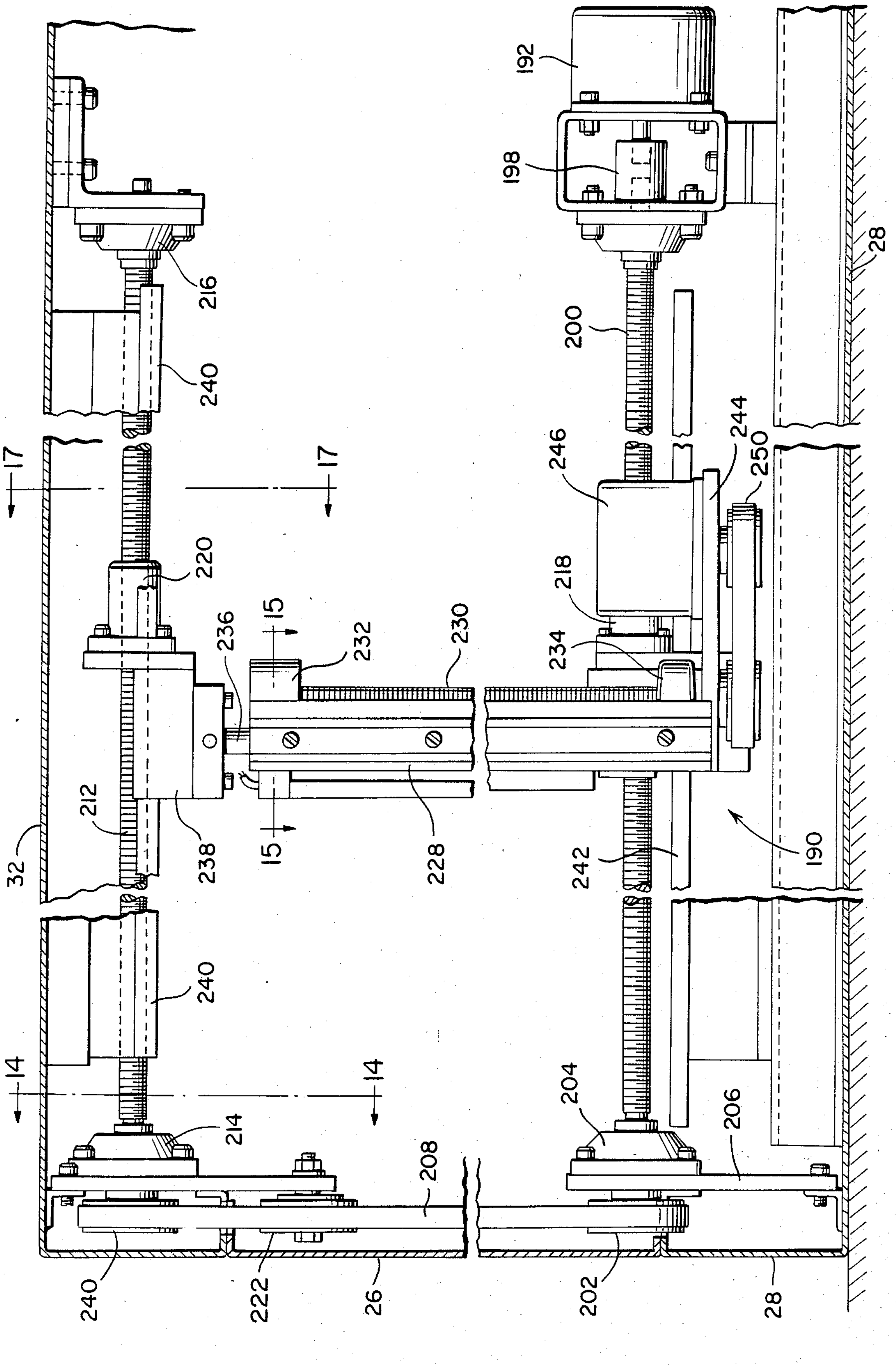
FIG. 13 is a partial front section view taken substantially through a plane indicated by section line 13—13 in FIG. 3.
Figure 14:
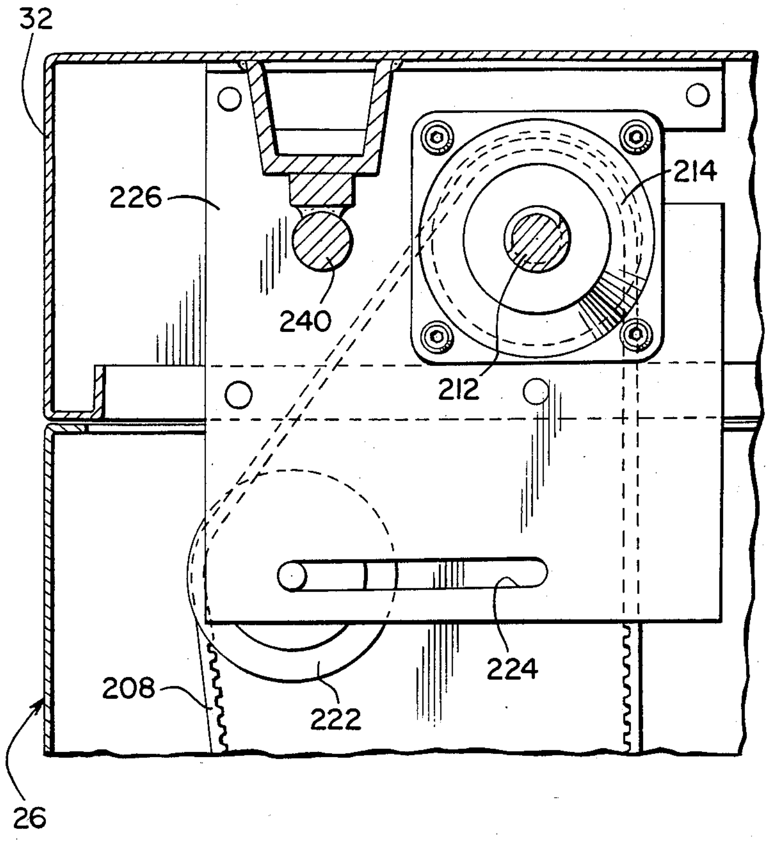
FIG. 14 is a partial section view taken substantially through a plane indicated by section line 14—14 in FIG. 13.

When the cassette holder 14 is displaced by the frictional drive mechanism 152 to its data reading position as hereinbefore described, it is also adapted to be returned to storage by a robotic transporter generally referred to by reference numeral 190 located within compartment 46 as shown in FIG. 2. The robotic transporter 190 as shown in FIG. 13, includes a drive motor 192 fixedly mounted on the base portion 28 of the cabinet with its power shaft connected by coupling 198 to a linear drive shaft 200 connected at one end opposite the motor 192 to a sprocket gear 202. The screw shaft 200 is rotationally supported by a bearing assembly 204 carried on a support plate 206 adjacent sprocket gear 202, the support plate 206 being secured to the base portion of the cabinet as shown. The sprocket 202 is drivingly connected by a positive drive belt 208 to a sprocket gear 210 connected to one end of an upper spiral screw shaft 212 supported by bearing assemblies 214 and 216 on the roof portion 32 of the cabinet for rotation about a horizontal axis fixed to the cabinet in parallel spaced relation to the rotational axis of the shaft 200. The shafts 200 and 21 are screw threaded effect movement in one horizontal transport direction through recirculating ball type nut assemblies 218 and 220 respectively mounted on and drivingly engaged with the respective shafts 200 and 212. The threaded drive shafts are simultaneously rotated at the same speed by drive motor 192 because of the driving connection of drive belt 208 entrained about sprockets 202 and 210 to which the screw shafts are respectively connected. The drive tension of belt 208 is maintained by an idler sprocket 222 slidably adjustable through a slot 224 in a plate 226 fixed to the roof portion 32 for support of the bearing assembly 214 journaling the upper screw shaft 212, as more clearly seen in FIG. 14.

Figure 16:
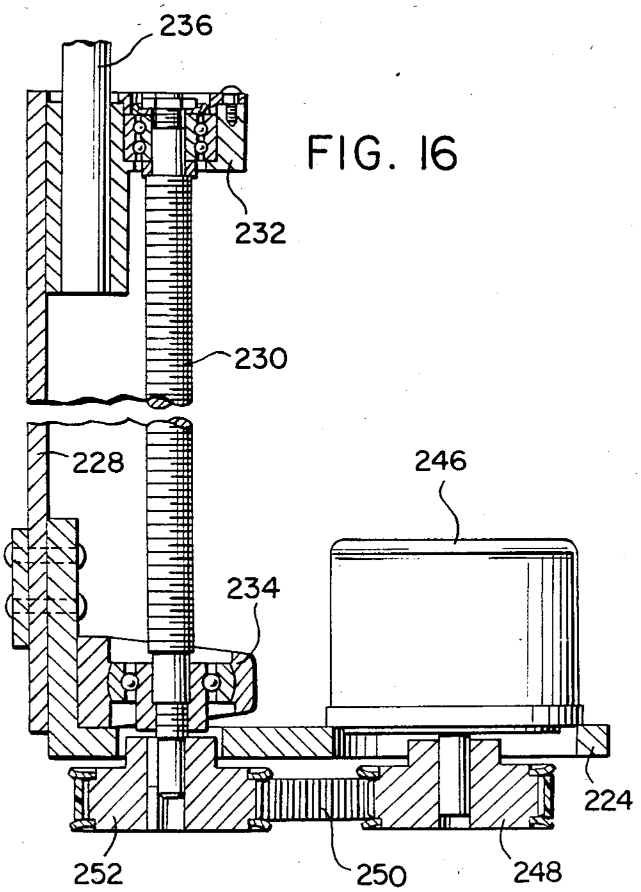
FIG. 16 is a partial section view taken substantially through a plane indicated by section line 16—16 in FIG. 15.
Figure 17:
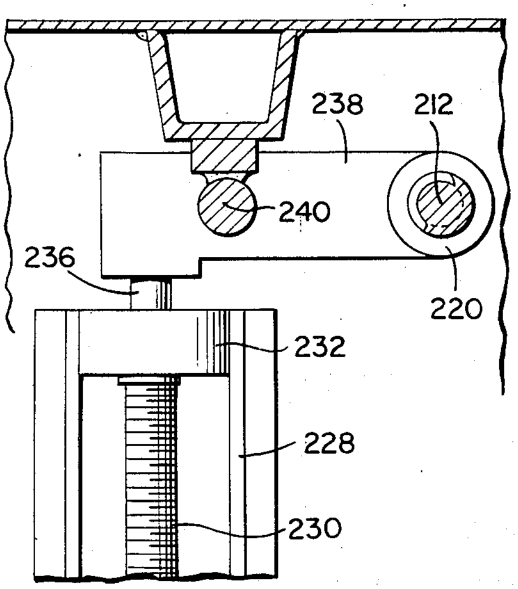
FIG. 17 is a partial section view taken substantially through a plane indicated by section line 17—17 in FIG. 13.

The nut assemblies 218 and 220 are axially displaced along the shafts 200 and 212 by said simultaneous rotation thereof for imparting movement to a track 228 in the horizontal transport direction. A vertical screw shaft 230 is rotatably mounted by upper and lower bearing assemblies 232 and 234 fixed to upper and lower end portions of the track support 228 as shown in FIGS. 13 and 16. A coupling shaft 236 interconnects the nut assembly 220 with the track support 228 through the upper bearing 232, and a guide bracket 238 which is slidable along a fixed guide shaft 240 to prevent rotation of the nut assembly 220. A similar coupling and rotation preventing guide arrangement involving fixed guide 242 is provided for the lower end of the track support. Also, an L-shaped bracket 244 is secured to the lower end of track support 228 as shown in FIGS. 13 and 16 on which a drive motor 246 is mounted. The drive motor 246 is connected to a sprocket gear 248 drivingly connected by drive belt 250 to driven sprocket gear 252 connected to the lower end of the screw shaft 230. The screw shaft 230 is thereby rotated about a vertical axis movable with the track support 228 in the horizontal transport direction aforementioned.

Figure 15:
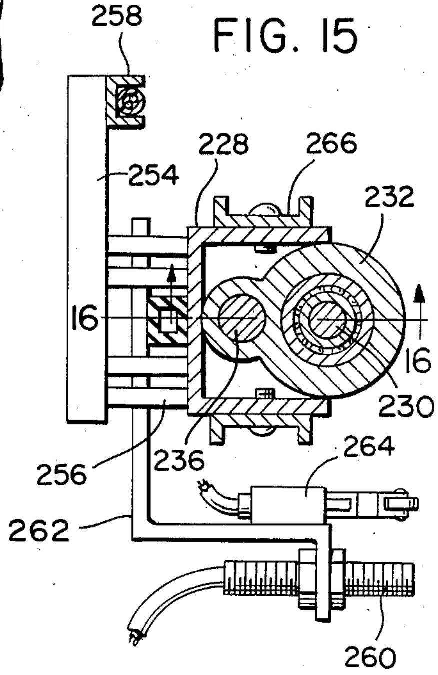
FIG. 15 is an enlarged partial section view taken substantially through a plane indicated by section line 15—15 in FIG. 13.

As shown in FIG. 15, the track support 228 has a vertically elongated bar 254 fastened to its web by spacers 256. The bar 254 extends laterally of the track support to carry an electric cable retainer 258 through which electrical conductors extend for connection to the drive motor 246 and other electrical components horizontally movable with the track support 228, such as a horizontal motion limit contactor 260 carried by a bracket 262 secured to the lower end of the track support and vertical motion limit switches 264 carried at the lower and upper ends of the track support 228.

The track support 228 mounts vertical tracks 266 on its legs as shown in FIG. 15 for guiding vertical transport movement of a track assembly 268 on which a gripper device 270 may be displaced in perpendicular transport directions in a common transport plane by rotation of the horizontal, fixed axis screw shafts 200 and 212 and the vertical, movable screw shaft 230 when the respective drive motors 192 and 246 are energized. The gripper device is thereby transported within the travel compartment of the cabinet between locations in the common transport plane operatively aligned with the storage zones 98, the realignment zone 99 and the port unit 62.

Figure 18:
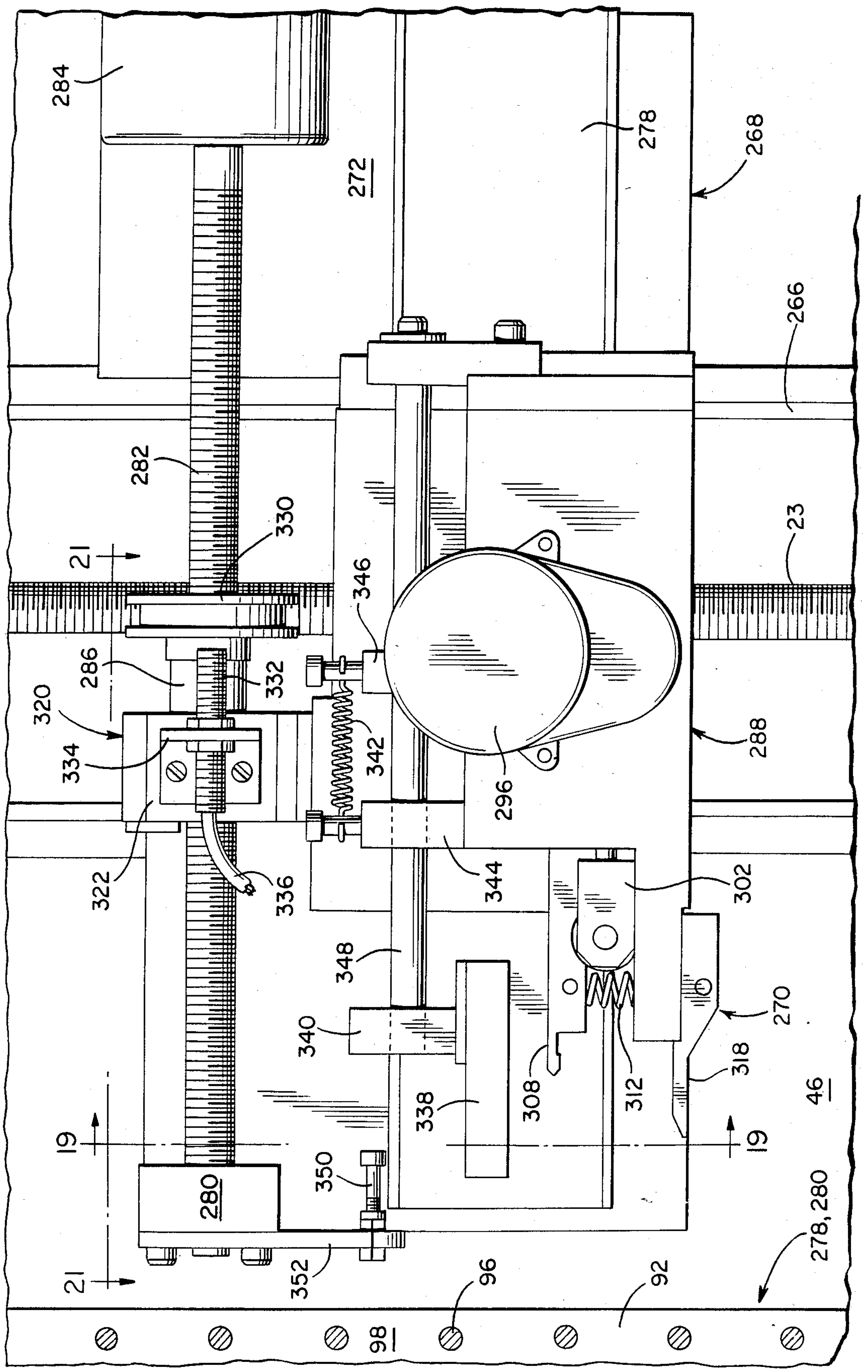
FIG. 18 is an enlarged partial section view taken substantially through a plane indicated by section line 18—18 in FIG. 1.
Figure 20:
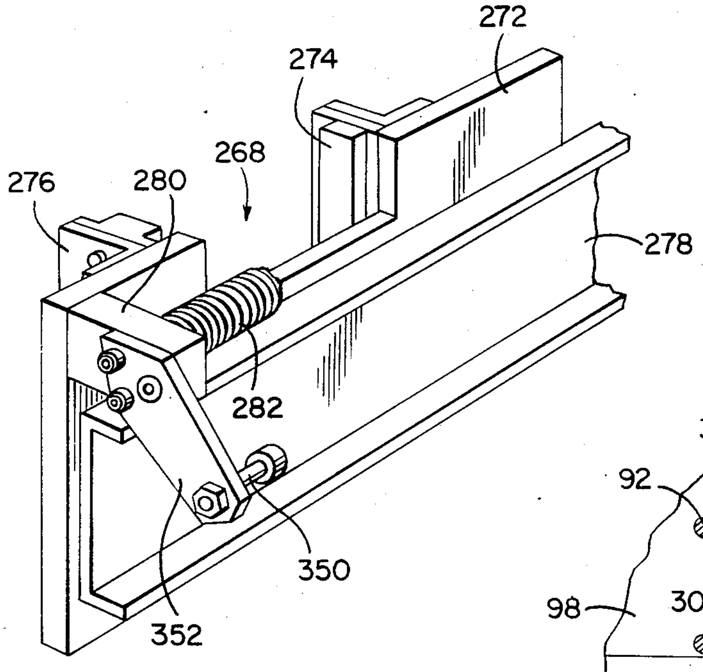
FIG. 20 is perspective view of a portion of the track assembly supporting the gripper within the machine.

The track assembly 268 as shown by itself in FIG. 20 includes a support plate body 272 mounting on one side a pair of spaced vertical rails 274 on L-shaped brackets 276. The rails 274 are adapted to be slidably received in the vertical tracks 266 on the track support 228. The other side of the plate body 272 mounts a horizontally elongated, channel-shaped track 278. A bearing block 280 is secured to one end of the plate body 272 above the track 278 for journaling one end of a screw shaft 282. As shown in FIG. 18, the screw shaft 282 is driven at the end thereof opposite bearing block 280 by a third drive motor 284 of the robotic transporter secured to the plate body 272 of the track assembly 268. The screw shaft 282 is thereby operative to axially displace a nut assembly 286 drivingly engaged therewith along a movable horizontal axis intersecting the common transport plane aforementioned at right angles thereto for imparting motion to the gripper device 270 in a cassette insertion and withdrawal direction relative to the storage assemblies or the port unit 62 extending through one of the storage assemblies 78. One end of the vertical track assembly 268 at which bearing block 280 is located, is therefore closely spaced horizontally from the edges of the partition walls 92 of the storage assemblies exposed to the travel compartment 46 of the cabinet.

Figure 19:
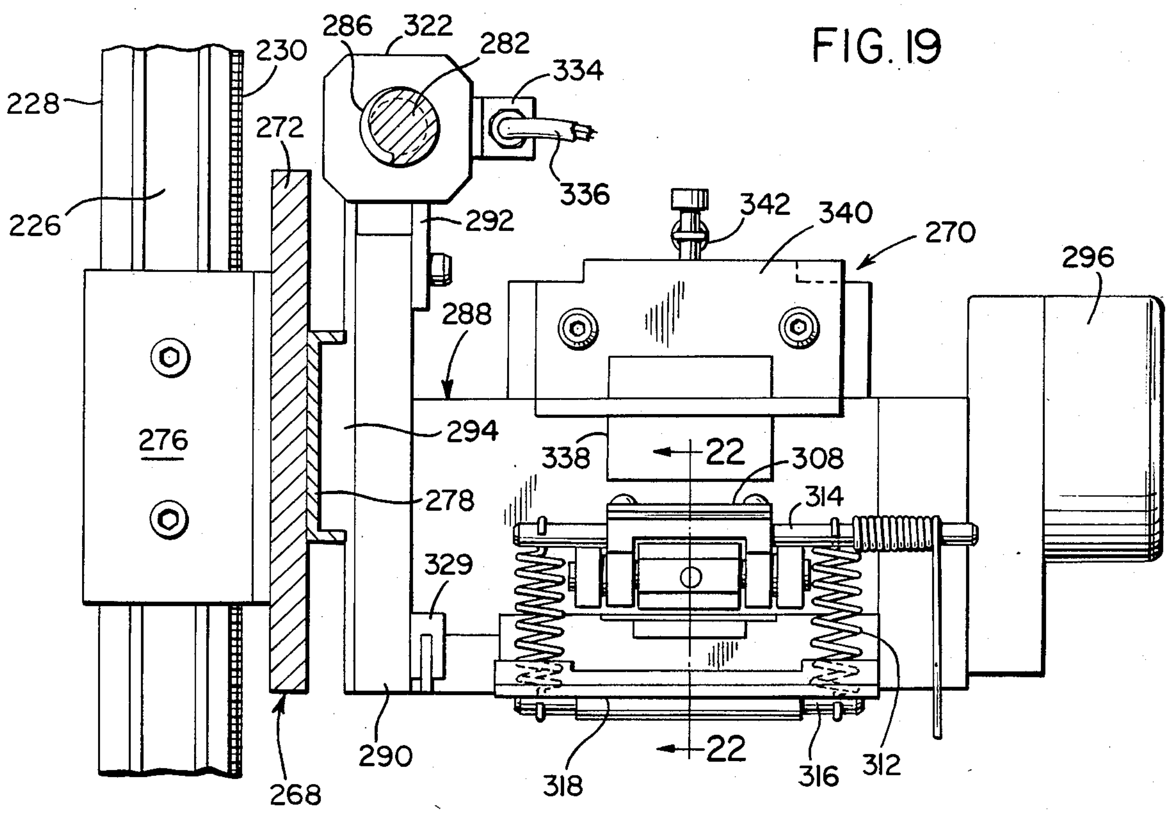
FIG. 19 is a section view taken substantially through a plane indicated by section line 19—19 in FIG. 18.

The gripper device 270 has a frame generally referred to by reference numeral 288 to which mounting plate 290 is attached. The nut assembly 286 is coupled to the mounting plate 290 of the gripper device through a lost motion connection established by a collision signalling device 320, having a slide block 322 connected by lug 292 to the mounting plate 290 as shown in FIG. 19. A rail 294 attached to one side of plate 290 opposite the gripper device is slidably received in the track 278 to guide movement of the gripper device and prevent rotation of the nut assembly 286 so as to confine it to axial motion along screw shaft 282 with the gripper device.

Figure 22:
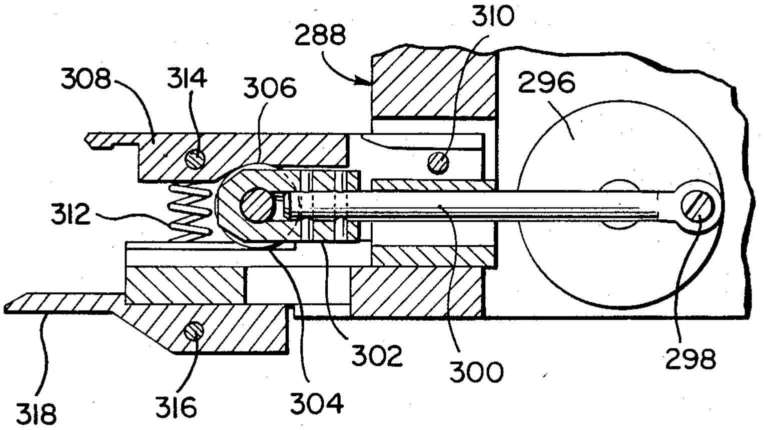
FIG. 22 is a enlarged partial section view taken substantially through a plane indicated by section line 22—22 in FIG. 19.

The gripper device 270 has a drive motor 296 mounted on its frame 288 opposite plate 290 as viewed in FIG. 19. The drive motor is drivingly connected through a crank pin 298 as shown in FIG. 22 to a connecting rod 300 slidably received at its end opposite crank pin 298 within a sleeve 302 journaling a cam roller 304. The cam roller 302 is adapted to be received in an arcuate recess 306 of a movable gripper jaw 308 pivotally mounted in the gripper frame by pivot pin 310. The movable jaw 308 is biased downwardly by a pair of coil springs 312 laterally spaced from the jaw 308 on opposite sides thereof. The upper ends of the springs 312 are anchored to a pin 314 projecting laterally from the movable jaw 312 on opposite sides thereof as more clearly seen in FIG. 19. The lower ends of springs 312 are anchored to the gripper frame 288 through a pin 316 extending through a lower jaw 318 fixed to the frame.

Figure 21:
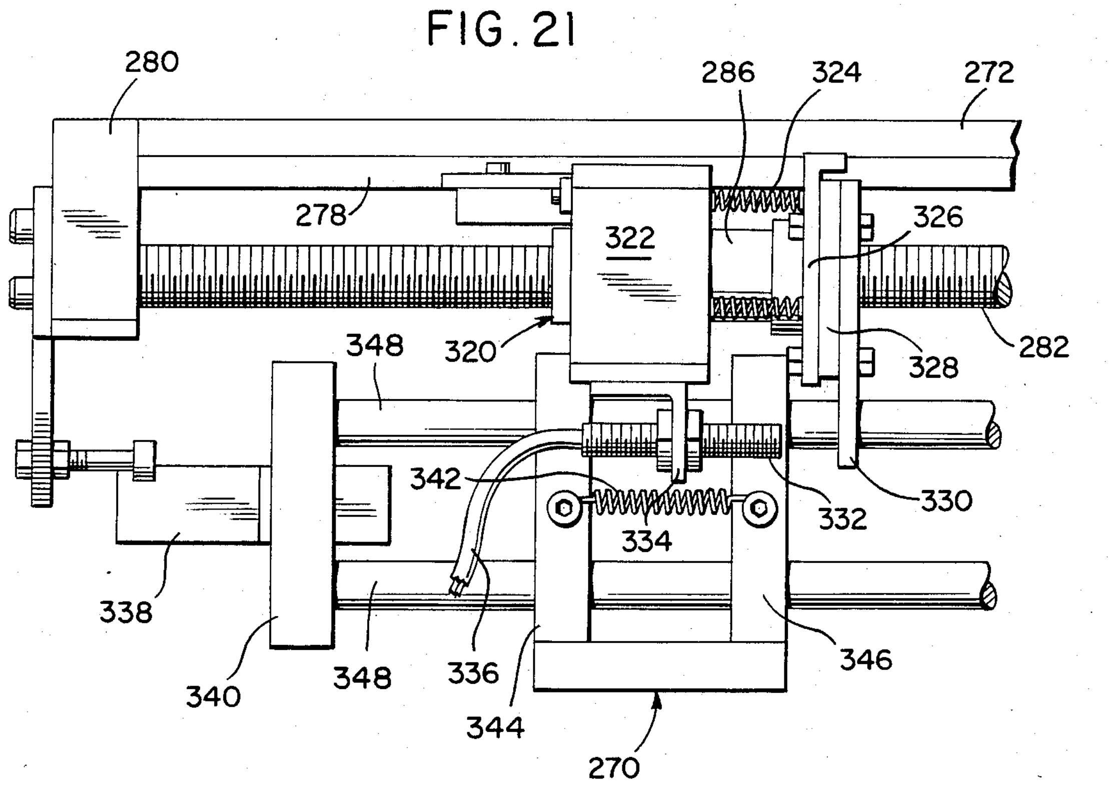
FIG. 21 is a partial section view taken substantially through a plane indicated by section line 21—21 in FIG. 18.

The collision signalling device 320 aforementioned, as shown in FIGS. 18, 19 and 21, is associated with the gripper device to register a collision with the gripper device caused, for example, by the erroneous delivery of an article clamped between the gripper jaws to a storage zone 98 already occupied. The slide block 322 of the collision signalling device is mounted on the nut assembly 286 and is biased by springs 324 to a normal position as shown in FIG. 21. The springs 324 are anchored directly to the nut assembly 286 by a plate 326, non-conductively spaced by spacer 328 from a contact element 330. When an excessive resistance to movement of the gripper frame 288 is experienced because of a collision, the resistive force is transmitted by slide block 322 to the springs 324 causing axial deformation thereof and relative displacement between the slide block and contact element 330 fixed to the nut assembly 286. In response to such relative displacement, a contactor 332 adjustably fixed to slide block 322 by bracket 334 engages the contact element 330 to generate the collision signal in cable 336.

Figure 23:
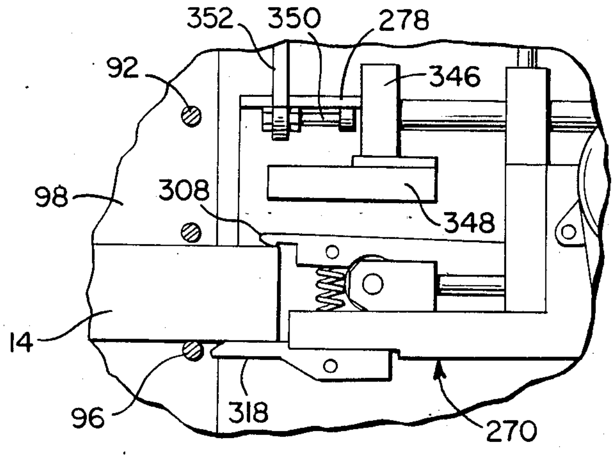
FIG. 23 is a partial section view corresponding to that of FIG. 18 but showing the gripper in a clamping position.

Also carried on the frame of the gripper device 270 is a bar code scanner 338 as shown in FIGS. 18, 19 and 21. The scanner is supported on a block 340 above the jaws 308 in a normal reading position, as shown, under the bias of a spring 342. Opposite ends of spring 342 are accordingly anchored to the gripper frame by block 344 and to the scanner 338 by a block 346 connected by slide shafts 348 to the scanner mounting block 340. The gripper device 270 may be displaced by energization of drive motor 284 in one directional sense to a position in which the scanner 338 is closely spaced from the storage assembly or the port unit 62 for reading of the bar code on strip 16 of a cassette. Arrival of the gripper device to such bar code reading position is signaled by limit switch 329 shown in FIG. 19. The gripper device 270 is further displaced from the code reading position by a small incremental amount in the same directional sense after being displaced vertically by an incremental amount to an article clamping position in which the lower fixed jaw 318 thereof is aligned with one of the support rods 96 of a storage zone 98 as shown in FIG. 23. When approaching such clamping position during vertical movement, the gripper motor 296 is energized to upwardly displace movable jaw 308 against the bias of springs 312 so that the end of a cassette holder 14 projecting into the travel compartment may be received between the open jaws and then clamped between the jaws upon deenergization of drive 296 as shown in FIG. 23. In such clamping position, the scanner 338 is retracted from its bar code reading position against the bias of spring 342 by an abutment element 350 engaging the scanner mounting block 340 as shown in FIG. 23. The abutment element 350 is adjustably secured to a lower end of a plate 352 secured to and projecting from the bearing block 280 as shown in FIGS. 18 and 20.

Figure 24:
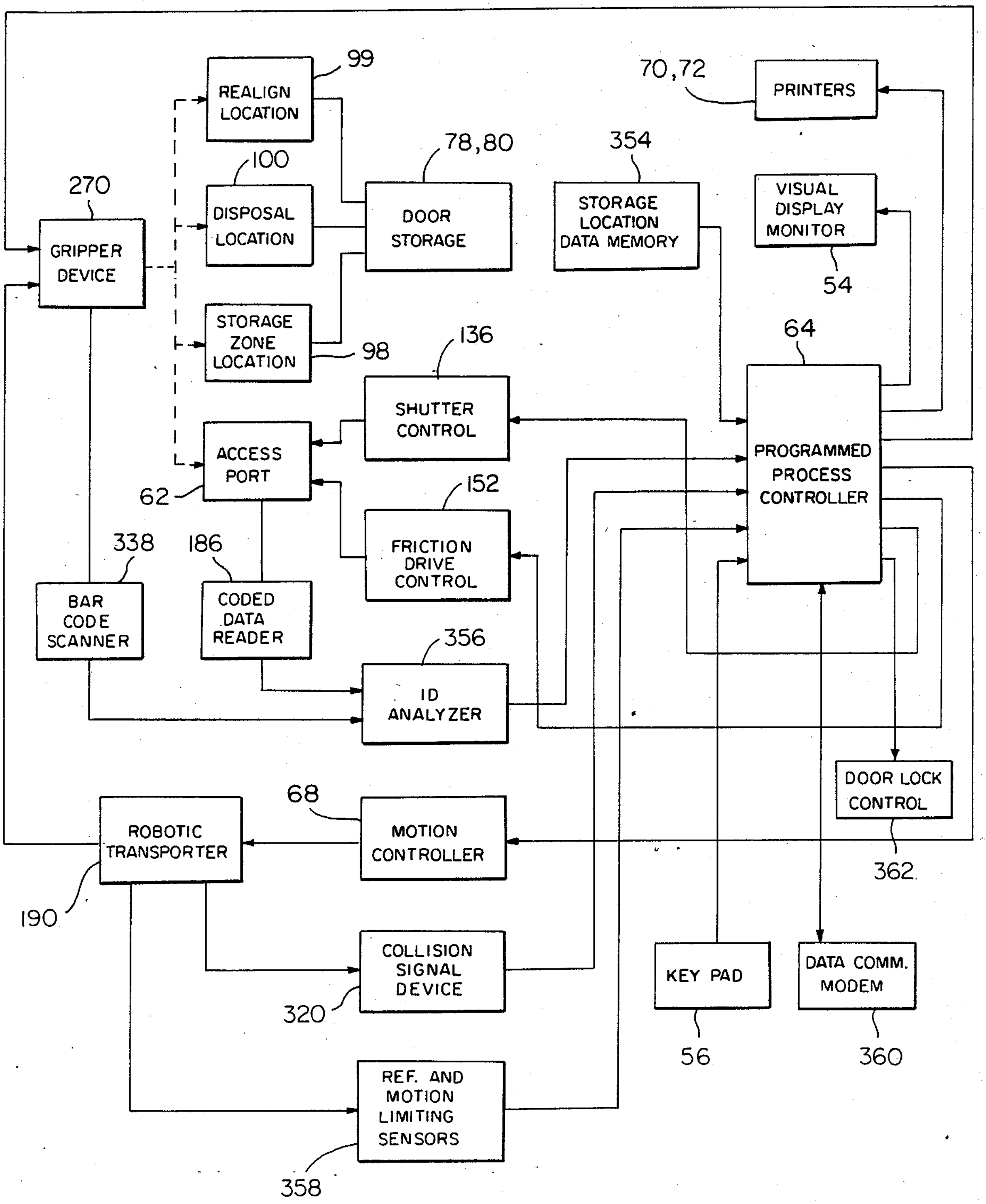
FIG. 24 is a functional block diagram showing the interrelationship between various mechanical and control components of the machine.

It will be apparent from the foregoing description that the gripper device 270 may be transported by robotic transporter 190 along the common plane between the locations aligned with the access port unit 62, the storage zones 98, the realignment zone 99 and the disposal zone 100 as diagrammed in FIG. 24. The robotic transporter is also operative to displace the gripper device 270 toward and away from the door storage at the locations aligned with storage zones 98, 99 and 100, or the access port 62 for data reading by means of scanners 186 and 338, and for clamping of the gripper device onto the cassette holders under control of its drive motor 296 as aforementioned. Travel of the gripper 270, on the other hand, is under control of programmed controller operation of computer 64 through the motion controller 68 having a step-by-step motion control characteristic in view of the incremental displacement requirement aforementioned. The local computer 64 acting as the process controller receives inputs from its memory 354 storing storage location data and an ID analyzer section 356 to which the outputs of the scanners 186 and 338 are connected. It is contemplated that additional inputs to the ID analyzer may be provided, such as the output of a weight sorting device utilized to determine the contents of certain types of products to be merchandised. The collision signal device 320 and the sensors collectively labeled 358 in FIG. 24, which includes reference position sensors and motion limiting sensors such as the motion control switch 142 and limit switches 146, 260, 264 and 329 aforementioned, provide process feedback data to the controller 64.

The controller 64 also receives inputs from the keypad 56 as aforementioned in connection with FIG. 5 for selection of the programmed operational mode of machine 10 as well as article selection codes. Data outputs from the process controlling computer 64 are also supplied to the visual display monitor 54 and the printer 70 and 72 as diagrammed in FIG. 24. A data communication modem 360 is provided to optionally interface the local computer 64 with a centrally controlled network of machines 10. Also, a door lock control 362 is provided as diagrammed in FIG. 24.

Figure 25:
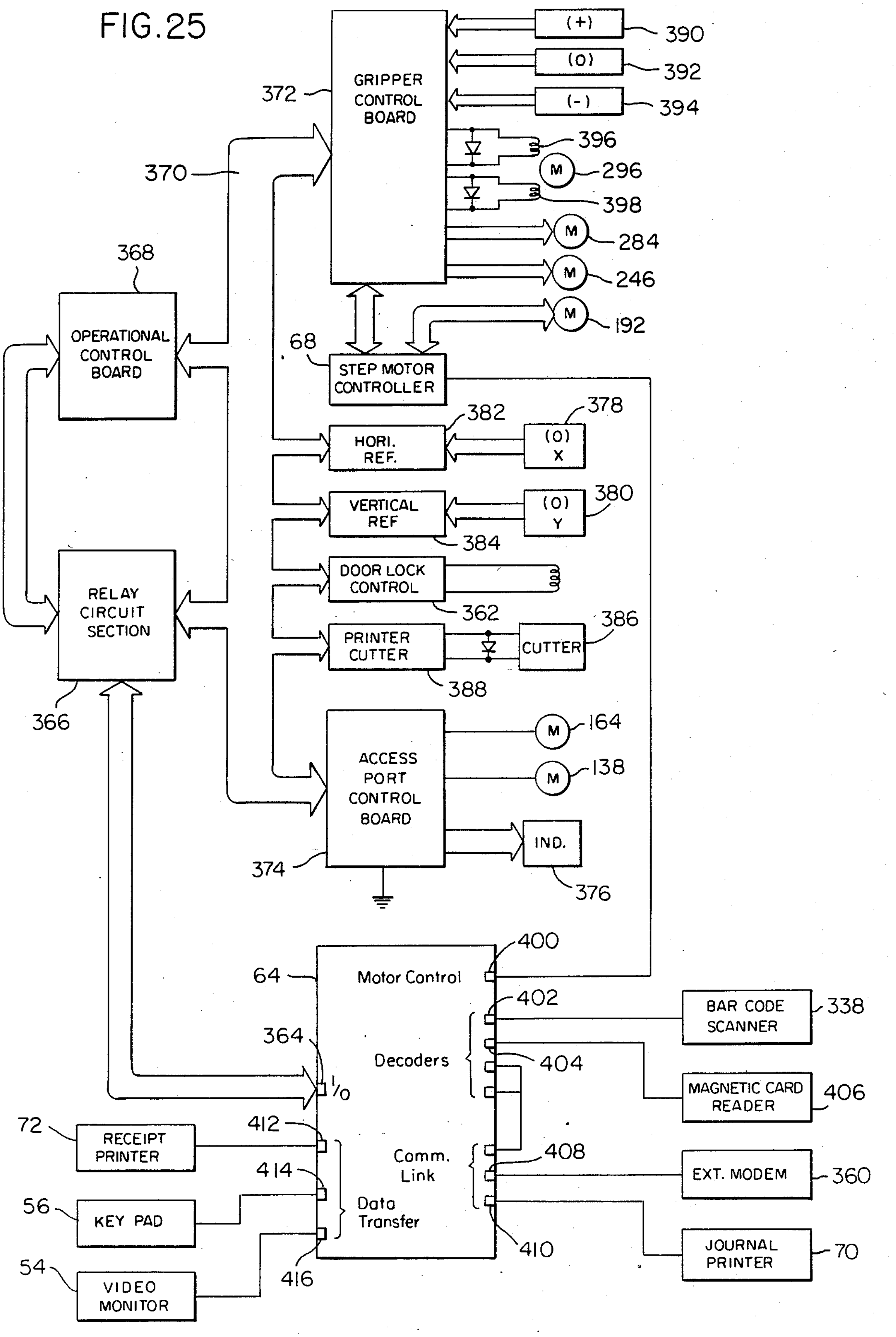
FIG. 25 is a functional block diagram illustrating the interfacing between various electrical components of the control system associated with the machine.

FIG. 25 illustrates in greater detail the interfacing between the local computer 64 and the various control components diagrammed in FIG. 24. The input/output port 364 of the computer is interfaced through relay circuit section 366 and an operational control board 368 with various operational components of the machine. Toward that end, the control board 368 and relay section 366 are interconnected with each other through a data bus 370 through which a gripper control board 372 and an access port control board 374 are interfaced therewith. The port control board 374 controls operation of cassette drive motor 164 and the port shutter motor 138 as well as a cassette delivery indicator 376.

Feedback data is fed to the data bus 370 from reference position sensor circuits 378 and 380 in connection with the horizontal and vertical transport of the gripper, through terminals 382 and 384. Output data from the data bus 370 is fed to the door lock control 362 aforementioned and to a receipt cutter 386 associated with the receipt printer 72, through terminal 388.

Feedback data related to transport of the gripper toward and away from the storage assemblies or port unit 62 is derived from sensor circuits 390, 392 and 394 connected to the gripper control board 372. The sensor circuits 390 and 394 involve limit switches, such as switches 329 aforementioned, to detect the end of travel of the gripper device in the insert/withdrawal direction intersecting the common transport plane, while the sensor circuit 392 detects arrival of the gripper at the reference or zero position in such direction of travel. The feedback data from the sensor circuits 390, 392 and 394 is fed through the gripper control board 370 to the data bus 370.

The gripper control board 372 also supplies output data to control energization of motor reversing coils 396 and 398 for the gripper jaw motor 296 and to control energization of the drive motors 246 and 284 for effecting travel of the gripper in the vertical transport direction and in the direction intersecting the transport plane, respectively. Energization of the drive motor 192 for effecting travel of the gripper in the horizontal transport direction is controlled directly through the motor controller 68 which is interfaced with the gripper control board 372 as shown. The motor controller 68 is connected to the motor control port 400 of the computer 64.

Decoder ports 402 and 404 of the computer 64 are connected to the scanner 338 and to a magnetic card reader 406 positioned in operative relation to the card slot 58 aforementioned in connection with FIGS. 1 and 2. Ports 408 and 410 connected to modem 360 and journal printer 70 establish the link and relationship necessary for operation of machine 10 as part of a network. Finally, the data transfer ports 412, 414 and 416 of computer 64 are connected to the receipt printer 72, the keypad 56 and the video monitor 54 as shown.

Figure 26:
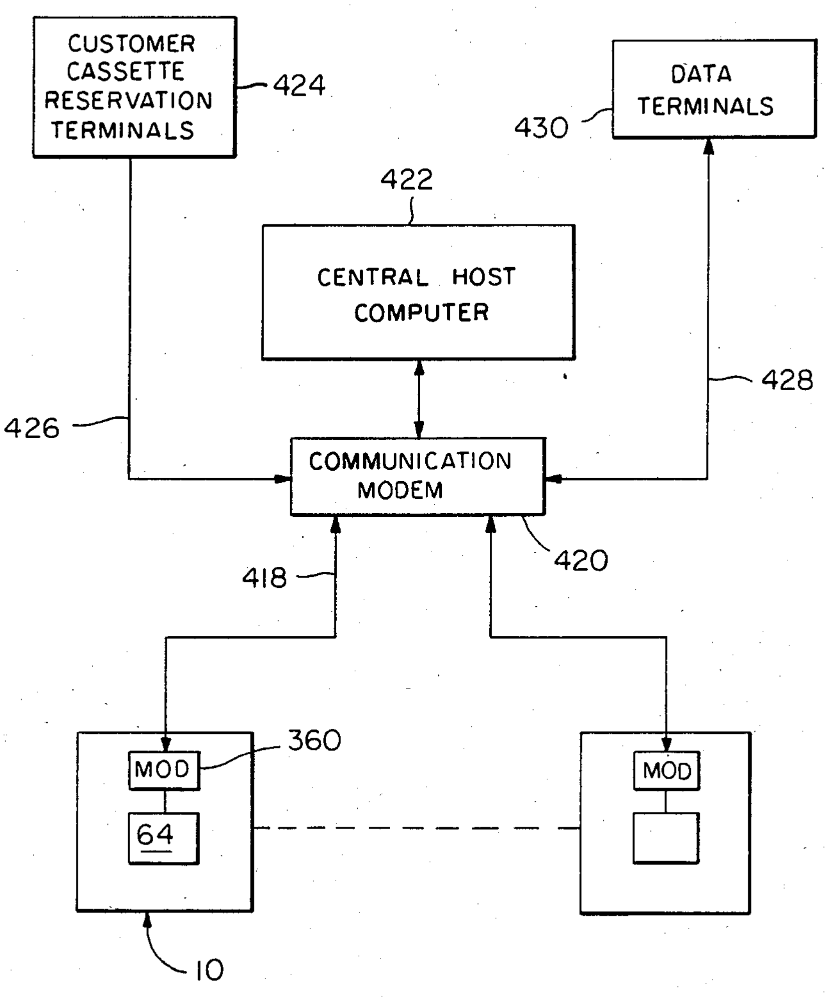
FIG. 26 is a block diagram diagrammatically illustrating a machine network system.

A typical network of machines 10 is diagrammed in FIG. 26, wherein each of a plurality of machines 10 is coupled through its computer modem 360 and a communication link 418, such as a telephone or data line, with a communication modem 420 associated with a central host computer 422. Customer reservation data is fed to the host computer from customer terminals 424 through a telephone network 426 connected to modem 420. A data network 428 couples the host computer through its modem 420 to data terminals located on the premises of cassette suppliers and banks, for example, associated with the cassette merchandising system formed by the network of machines 10 under joint control of their local computers 64 and the host computer 422 remote therefrom.

The local computer 64 of each machine 10 is programmed to carry out the various merchandising functions associated therewith, based on the arrangement of mechanical and electrical components hereinbefore described. As part of a network system, computer 64 is operated as a slave terminal dominated by the central host computer 422 to control rent, return and purchase transactions through its machine 10 as well as other functions such as financial collection and processing transactions, credit verification and status, inventory, maintenance and recovery operations. Some of the host computer functions are incorporated in the software for the local computer 64 so that the machine 10 may be operated as a stand alone unit.

Figure 28:
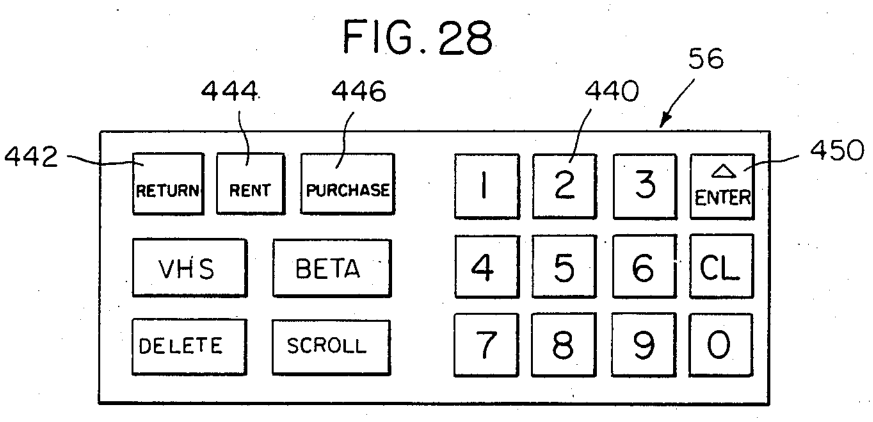
FIG. 28 is a top plan view of the keypad associated with the machine.
Figure 27:
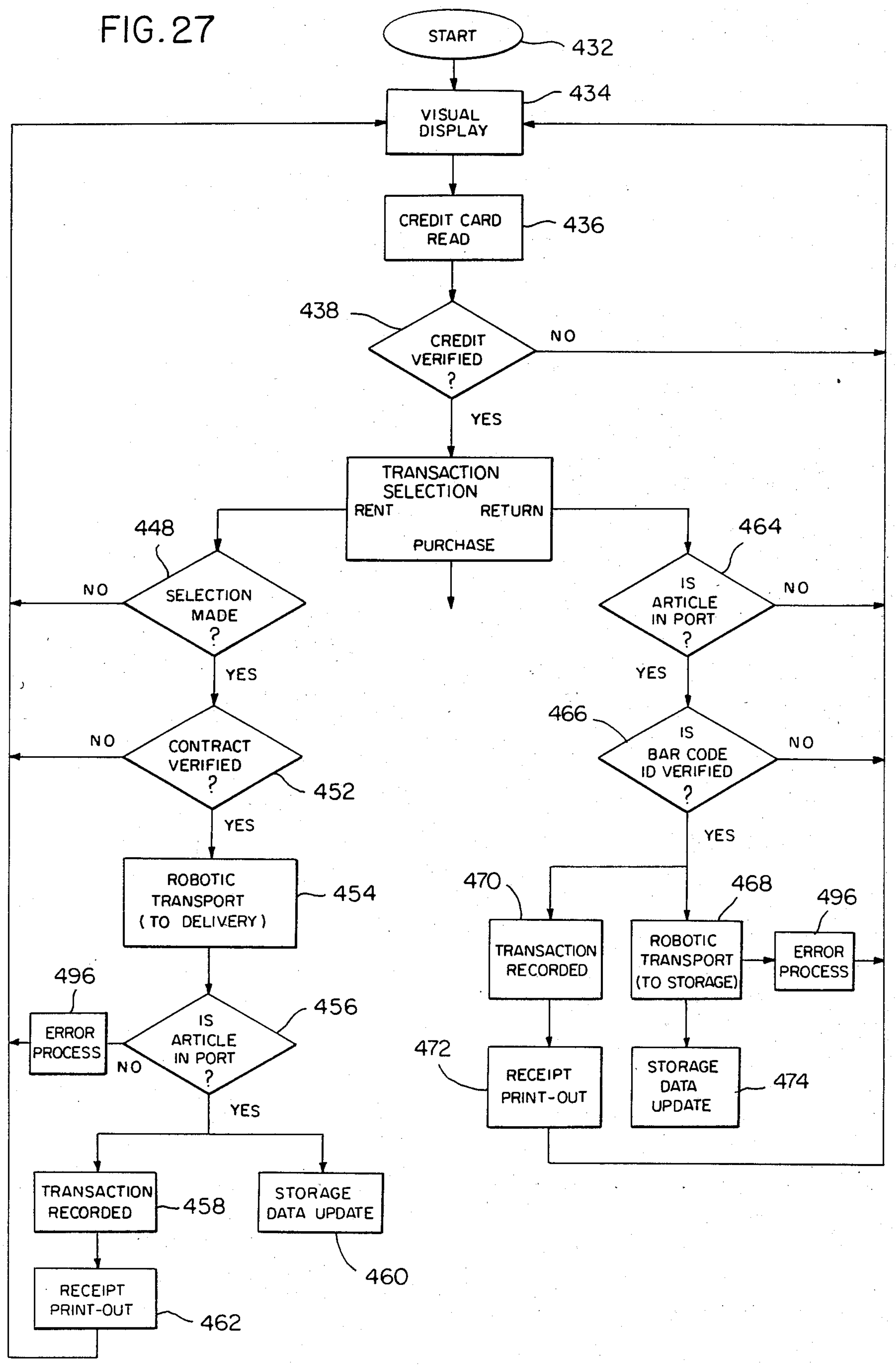
FIG. 27 is a program flow chart illustrating the basic process associated with customer operation of the machine.

The machine 10 is activated through its local computer 64 as denoted at 432 in the program flow chart of FIG. 27, by insertion of a magnetic credit card through slot 58 into the reader 406 resulting in a step-by-step instructional display function 434 on the screen of the video monitor 54. Article selection is then made by the user from the information on the posters 52 as shown in FIGS. 1 and 2. A credit card reading function 436 is then performed as shown in FIG. 27. If the credit card is validated, the software function 438 enables the keypad 56 so that the user may enter a selection code command through the number digit keys 440, as shown in FIG. 28, and one of the transaction keys 442, 444 and 446. When the selection command is properly entered as indicated at 448 in FIG. 27, a transaction contract is displayed on the video monitor so that the user may then actuate the enter key 450 on the keypad to verify the contract as denoted by reference numeral 452 in FIG. 27 to continue machine operation in a rental mode. The robotic transporter then undergoes an operational process 454, on command of the central system hereinbefore described, to deliver the selected article to the access port 62. The operational transport process involves computation of the distances between the access port and the storage zones holding the selected articles so as to select the nearest available selected article zone to provide the shortest operational time for the transport process. Upon completion of the transport process, the presence of the selected article in the access port is detected by its sensor as denoted by 456 in FIG. 27 to continue the rental process to a conclusion by effecting the recording step 458 in parallel with a storage data update 460 followed by receipt print-out 462.

The programmed purchase process is similar to that of the rental process described except for the content of the receipt print-out and transaction recording. In the case of a rental operation, an open transaction record is made, including registration of the credit card number, article identification code number, date and time, and provision for closing the transaction without charge to the customer within a preprogrammed time span. Thus, such recording process is terminated to close the transaction in an overdue rental situation. In the case of a purchase operation, the transaction recording process is closed to begin with.

The open transaction recording process is, of course, closed by timely start of return mode of operation as also denoted in FIG. 27, when insertion of the article into the access port 62 by the customer is detected as step 464 of the program following actuation of the return key 442 on the keypad. The access port is then closed by its shutter and the gripper is moved to the scanning position for reading of the ID bar code on strip 16 by means of scanner 338 as hereinbefore described. When the bar code ID is verified as denoted at 466, the article is clamped by the gripper for transport to the closest empty storage zone 98 in a return transport process denoted by 468 in FIG. 27. The return status of the accepted article is computed at the same time and recorded as indicated at 470 followed by print-out of receipt at 472. Also, upon completion of the return transport process 468, the computer memory is updated as indicated at 474.

The data recorded at the end of closed transactions at each machine 10 of a network as hereinbefore described, is periodically transferred to the central host computer 422 on demand. Otherwise, such data may be periodically withdrawn manually from the journal printer 70. The software for the local computer 64 will also include service modes to enable servicing, maintenance, unloading and reloading of articles. The service modes are initiated by insertion of a service card in the magnetic card reader through slot 58 and entry of a service code through the keypad 56. According to one code-identified service category, repair duties may be performed. According to another service mode category, only service operations are permitted, such as article loading and unloading, printer paper replacement and exchange of display posters 56.

Figure 29:
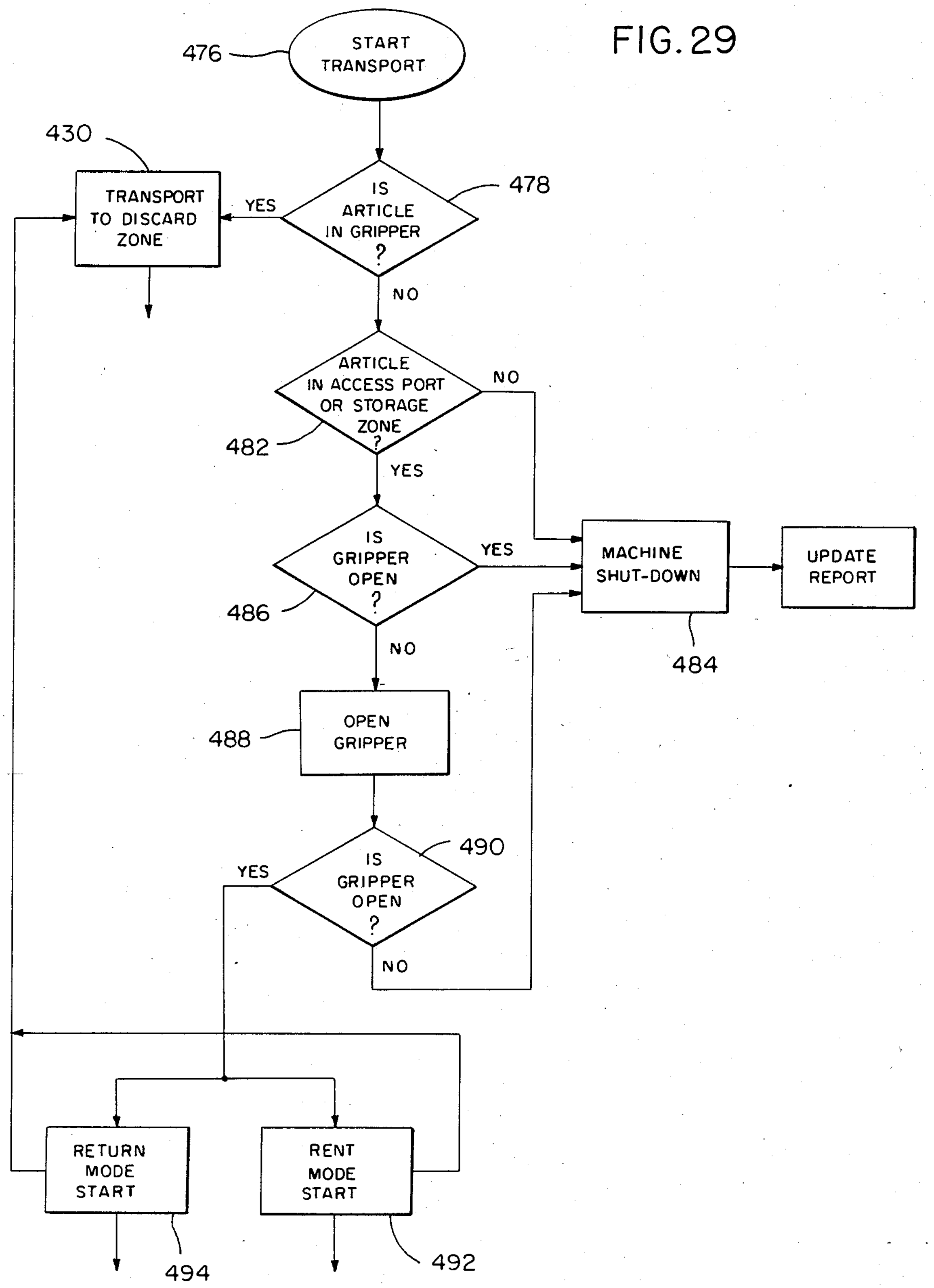
FIG. 29 is a program flow chart diagramming the transport processes associated with operation of the machine.

The programs associated with the transport processes 454 and 468 diagrammed in FIG. 27, are shown in the flow chart diagram of FIG. 29. The transport program is initiated on command denoted by start 476 with article detection in the gripper as denoted by 478. If there is an article in the gripper, a transport process 480 is initiated, similar to the process to be described, for delivery of the article to the discard zone 100. The transport process program continues if there is no article in the gripper with the detection at 482 of an article (either in the port 62 or a selected storage zone 98, depending on the transport mode). If there is no article present (in port 62 or the selected storage zone), machine shut-down 484 occurs. The transport program continues with detection at 486 as to whether or not the gripper jaws are open. If the gripper is open, shut-down occurs; if closed, the program continues with the opening of the gripper on command at 488. When the open condition of the gripper is detected at 490, the transport process continues either with a rent mode start 492 or a return mode start 494 depending on the mode selection made through the keypad 56 as aforementioned. The transport program is completed in the rent mode as diagrammed in FIG. 30 or in the return mode as diagrammed in FIG. 31.

Figure 30:
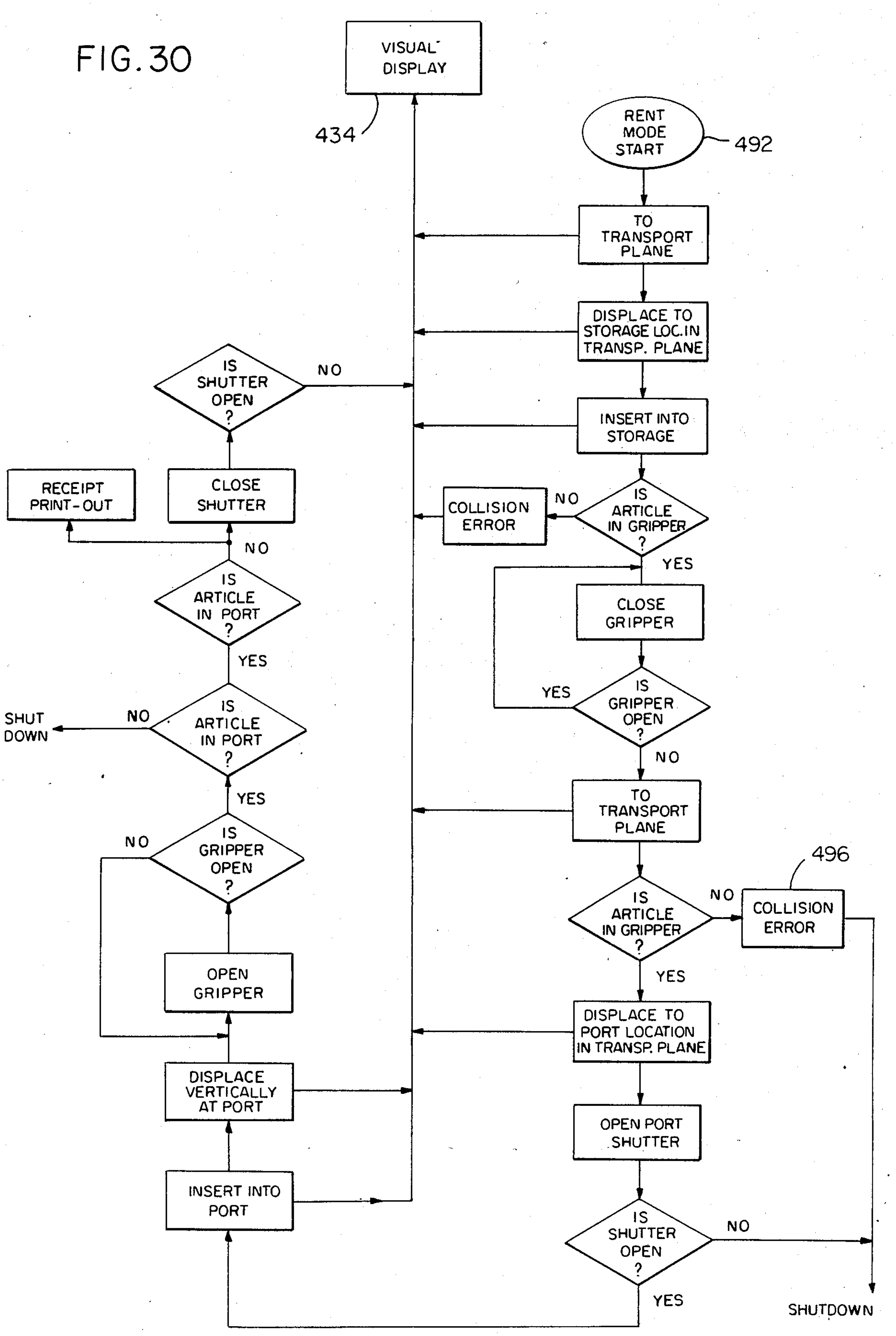
FIGS. 30 and 31 are program flow charts respectively illustrating the rent and return program modes of the machine software.
Figure 31:
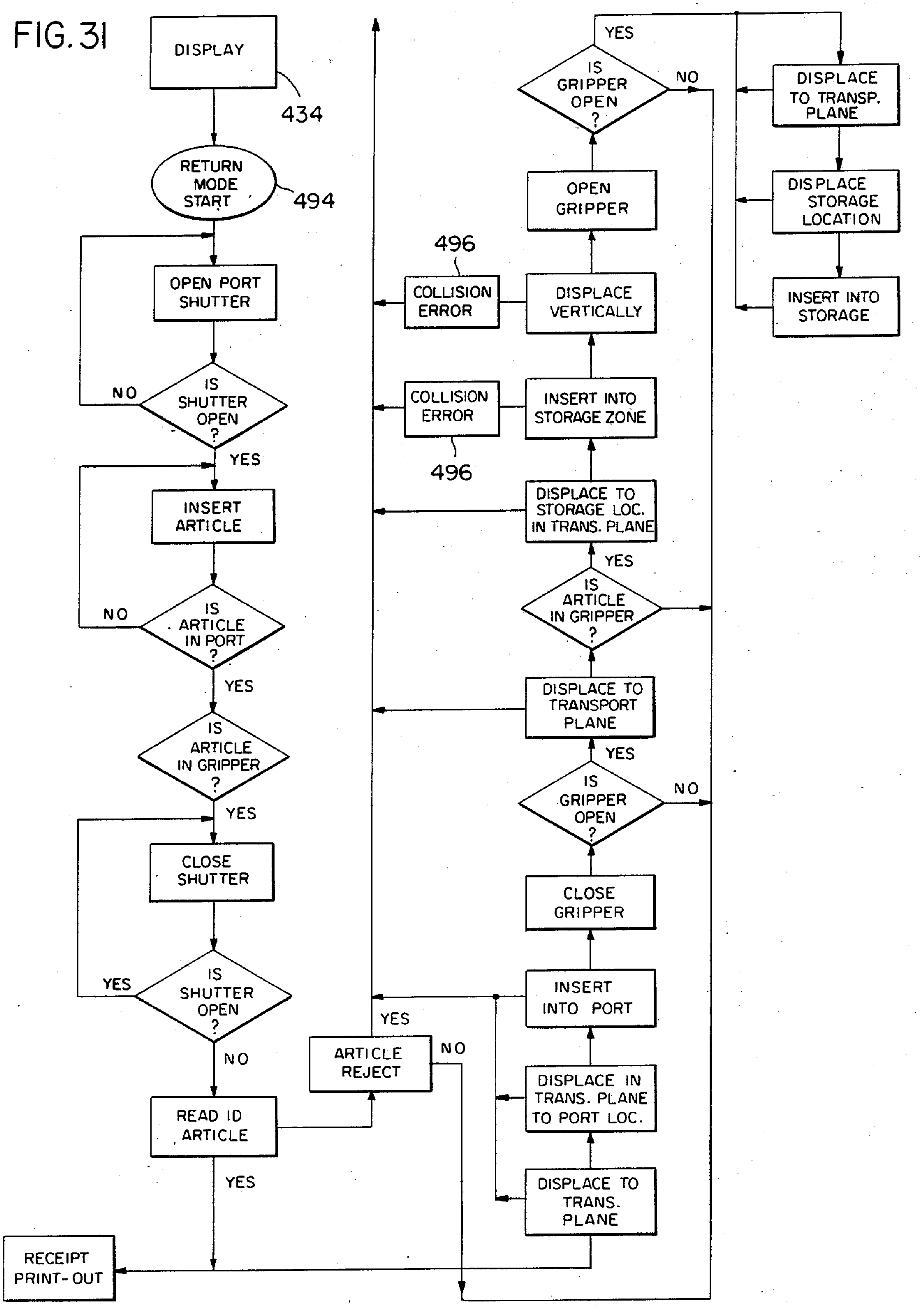
Figure 32:
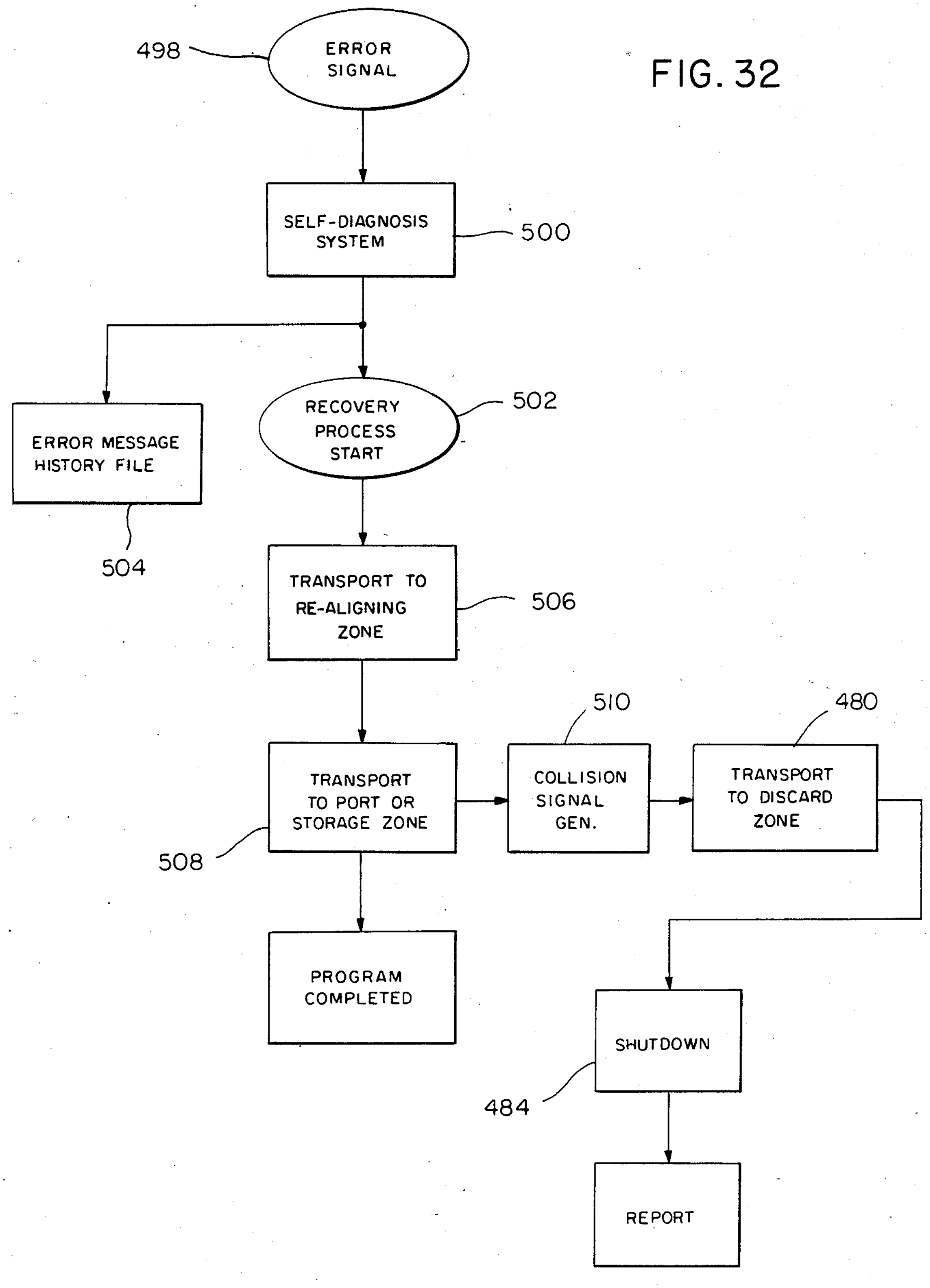
FIG. 32 is a program flow chart diagramming the programmed error processes associated with the operation of the machine.

As diagrammed in FIGS. 27, 30 and 31, error processes 496 occur in response to signals which may be generated by the collision signalling device 320, hereinbefore described, during the transport processes. The programmed error process as diagrammed in FIG. 32, begins with the error signal start 498 to enable a self-diagnostic system 500 through which a recovery process begins at start 502 and an error message recorded at a history file 504 in the computer memory. The recovery process according to one embodiment hereinbefore described, involves a transport operation 506 to the re-aligning zone 99 followed by a second transport operation 508 to either the port 62 or another storage zone 98. If another collision occurs to generate a second signal denoted at 510 in FIG. 32, transport denoted at 480 to the discard zone 100 is initiated after which shut-down donated at 484 occurs and a report is produced.

Figure 33:
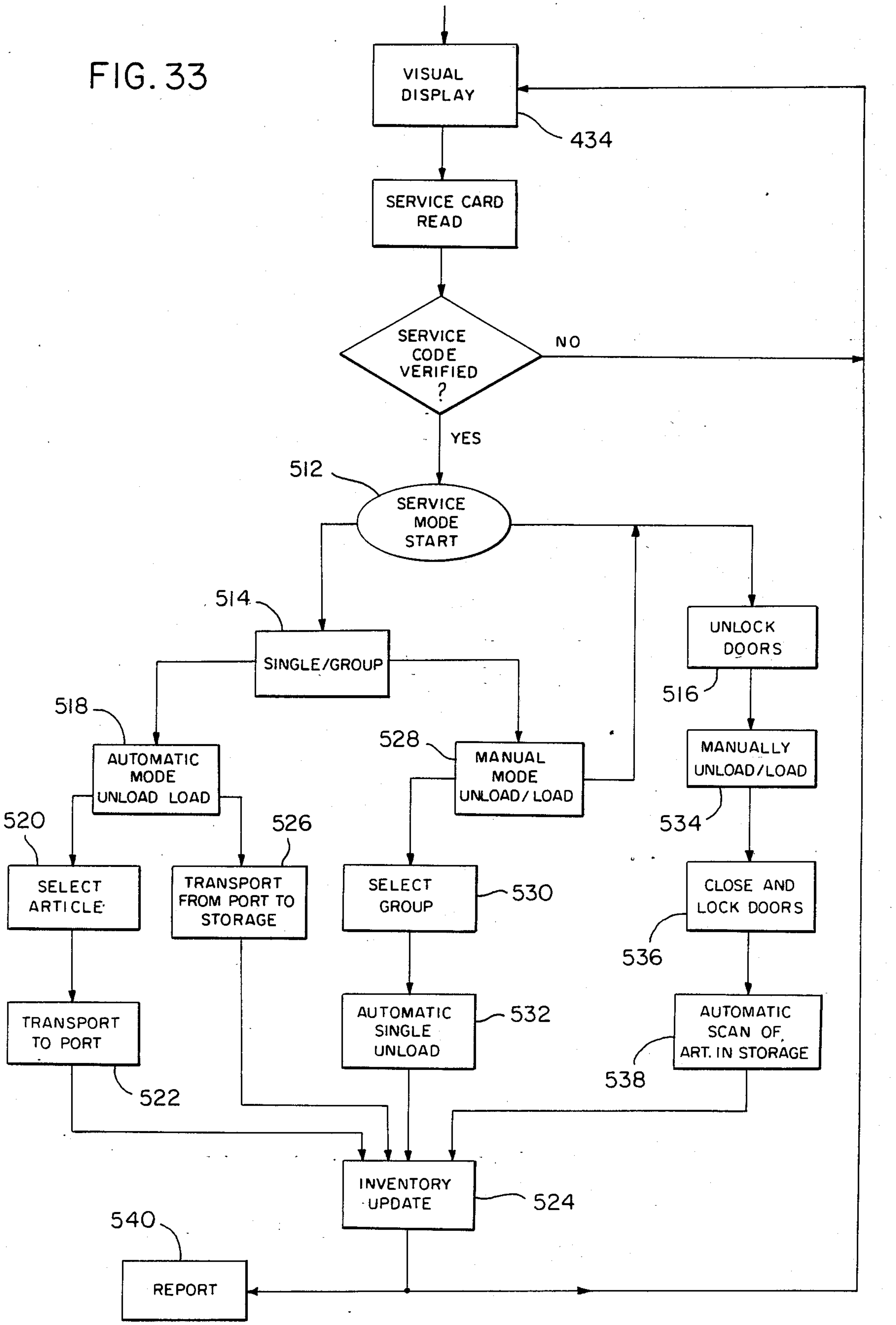
FIG. 33 is a program flow chart diagramming the service modes associated with programmed control of the machine.

FIG. 33 diagrams the operational procedure accommodated by the mechanical and control arrangements and the software programs hereinbefore described for performing the article loading and unloading service functions with respect to machine 10. Insertion, reading and verification of a magnetic service card initiates the service mode involved as denoted at 512 to either automatically perform the unload/load function one-by-one or in groups as denoted by 514, or enable manual unload/load by unlocking the doors through control 362 aforementioned, as denoted by 516.

The automatic unload/load operation 518 follows entry of the single article command from 514 as shown in FIG. 33, involving the article selection step 520, transport step 522 and inventory update 524. Automatic load involves the transport step 526. In the case of a group unload/load function, a manual operation 528 is enabled. For unloading purposes, an ordered group selection is entered as indicated at 530 to trigger an automatic one-by-one sequential unloading operation 532 with respect to the articles of the selected group, followed by inventory update 524. Loading under the manual mode 528 unlocks the doors of the machine to permit manual loading or unloading as indicated at 534 after which a door closing and locking operation 536 is manually performed. When the doors are locked, an automatic scanning operation 538 is triggered to provide data for the inventory update 524. Entry of update data is recorded for report 540 and registered through the visual display 434.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. In a machine for storing, dispensing and receiving articles, including storage means for establishing a plurality of separate storage zones respectively receiving the articles in a predetermined orientation and a discard zone, re-aligning means mounted within one of the storage zones for engagement with the articles inserted therein to restore said predetermined orientation thereof, a port through which the articles are delivered and returned, robotic means for transporting the articles between the port and the storage means, means responsive to interrupted insertion of the articles into one of the storage means by the robotic means for generating a signal and programmed control means operatively connected to the robotic means and responsive to said signal for transport to an insertion of the articles into the realigning means followed by travel and insertion into another of the storage zones on the absence of a second signal from the signal generating means.

2. The machine as defined in claim 1 including a cabinet enclosing the storage means, drive engaging means operatively mounted in the port for displacement of the articles therein between at least two positions, and scanner means for identifying the articles in the port at one of said positions therein, said robotic means including gripper means for clamping thereto the articles within the storage means and the port.

3. The combination of claim 2 wherein said cabinet includes a travel compartment within which the robotic means is enclosed, at least one door assembly within which the storage means is mounted and means pivotally mounting the door assembly for displacement between an open position and a closed position substantially sealing the travel compartment.

4. The combination of claim 3 wherein said port is mounted by the door assembly and extends through the storage means into the travel compartment in the closed position of the door assembly.

5. The combination of claim 4 wherein said robotic means further includes drive means for imparting motion to the gripper means in horizontal and vertical transport directions in a common transport plane within the travel compartment between locations aligned with the port and said zones of the storage means and additional drive means for retraction and insertion of the articles clamped in the gripper means in a third direction intersecting said transport plane.

6. A machine for storing, dispensing and receiving articles, comprising: a cabinet, a transaction port in said cabinet through which the articles are delivered and returned, gripper means for clamping thereto the articles positioned in a predetermined orientation within said port, robotic transport means connected to the gripper means for travel of the clamped articles to and from said port, storage means for establishing a plurality of separate zones respectively receiving the articles therein from said gripper means, and realigning means mounted within one of said zones for restoring articles inserted therein in a misaligned condition with respect to said predetermined orientation of said articles clamped in said gripper means to said predetermined orientation prior to said travel of the clamped articles to another of said zones of said storage means.

7. The machine as claimed in claim 6 wherein: said robotic transport means displaces said gripper means in a common transport plane between predetermined locations and in a direction intersecting said plane at said predetermined locations, means are provided for operatively mounting said gripper means on said robotic transport means for accommodating relative displacement between said gripper means and said robotic transport means at one of said predetermined locations in response to excessive resistance to movement of said gripper means in said direction intersecting said common transport plane, collision indicating means is provided responsive to said relative displacement for generating a signal indicating collision of said gripper means, and programmed means is provided operatively connected to said robotic transport means for effecting the displacement of said gripper means from said one of said predetermined locations to another of said predetermined locations in response to said signal.

8. The machine as claimed in claim 7 wherein:

said gripper means is displaced by said robotic transport means in said direction intersecting said common plane at said one of said predetermined locations under control of said programmed means.

9. The machine as claimed in claim 6 and further comprising:

means for carrying said gripper means in a transport position on said robotic transport means, scanner means, means for mounting said scanner means on said gripper means for retraction from a data reading position on said gripper means, means for displacing said gripper means on said robotic transport means at said separate zones from said transport position, and means for effecting said retraction of said scanner means from said data reading position in response to said displacement of said gripper means from said transport position on said robotic transport means.

10. In a machine for storing, dispensing and receiving articles, including a cabinet, means for storage of the articles within the cabinet, a port in said cabinet through which the articles are delivered and returned, drive engaging means operatively mounted in the port for displacement of the articles therein between at least two positions, scanner means for identifying the articles in the port at one of the said positions therein, gripper means for clamping thereto the articles in operatively oriented positions within the storage means and the port and robotic transport means connected to the gripper means for travel of the clamped articles between the port and the storage means, said cabinet including a travel compartment within which the robotic transport means is enclosed, at least one door assembly within which the storage means is mounted and means pivotally mounting the door assembly for displacement between an open position and a closed position substantially sealing the travel compartment, said port being mounted by the door assembly and extending through the storage means into the travel compartment in the closed position of the door assembly, said storage means including article support means for establishing a plurality of separate storage zone respectively receiving the articles in said operatively oriented position therein, realigning means mounted within one of the said storage zones for engagement with the articles inserted therein to restore said operatively oriented positions thereof, said storage means further including a discard zone, said robotic transport means including drive means for imparting motion to the gripper means in horizontal and vertical transport directions in a common transport plane within the travel compartment between locations aligned with the port and said zones of the storage means and additional drive means for retraction and insertion of the articles clamped on the gripper means in a third direction intersecting said transport plane, means for generating a signal in response to interruption in motion imparted to the gripper means in said third direction during insertion of the articles into one of the storage zones and programmed control means operatively connected to the drive means of the robotic transport means and responsive to said signal for continued travel of the gripper means and insertion of the articles clamped thereto into the realigning means and subsequent travel and insertion into another of the storage zones in the absence of a second signal from the signal generating means.

11. The combination of claim 10 wherein said programmed control means effects continued travel and deposit of the articles in the discard zone in response to the second signal.

12. The combination of claim 11 wherein said drive means includes a pair of drive shafts rotatably mounted within the travel compartment about fixed axes parallel spaced along said horizontal transport direction, track means in driving engagement with said drive shafts for displacement of the gripper means along said horizontal transport direction, and drive connecting means between said drive shafts for simultaneous rotation thereof at equal speeds.

13. The combination of claim 12 wherein said track means includes a horizontal track device slidably mounting the gripper means for guiding displacement thereof along said third direction by the additional drive means and a vertical track device for slidably guiding displacement of the horizontal track device along the vertical transport direction by the drive means.

14. The combination of claim 13 including means mounting the scanner means on the gripper means for limited displacement relative thereto.

15. The combination of claim 14 including abutment means mounted by the horizontal track device for engagement with the scanner mounting means in an article clamping position of the gripper means at one of the aligned locations within the travel compartment causing said limited displacement of the scanner means from a scanning position.

16. The combination of claim 15 wherein said port includes an elongated guide member within which the articles are received and shutter means mounted on the guide member for displacement between open and closed positions respectively admitting and blocking insertion therein of the articles, and spring biased means mounting the drive engaging means on the guide member for projection into driving engagement with the articles inserted therein.

17. The combination of claim 16 wherein the gripper means includes a body on which the scanner means is carried, a lower jaw fixed to the body and projecting forwardly therefrom in said third direction, a movable jaw pivotally mounted on the body above the lower jaw, spring means for biasing the movable jaw to a clamping position and powered actuator means for displacement of the movable jaw from said clamping position under control of the programmed control means.

18. The combination of claim 17 including holders within which said articles are retained during delivery and return, respectively, each of said holders having a openings through which coded indicia on the articles is exposed to the scanner means and a surface portion engaged by the drive engaging means.

19. The combination of claim 10 wherein said programmed control means effects continued travel and deposit of the articles in the discard zone in response to the second signal.

20. In a machine for storing, dispensing and receiving articles, including means for storing the articles, a port through which the articles are delivered and returned, scanner means for identifying the articles received in the port, robotic means for transport of the articles between the port and the article storing means, gripper means carried by the robotic means for releasably holding the articles during transport between the port and the storing means, means mounting the scanner means on the gripper means for limited displacement relative thereto, and abutment means on the robotic means for engagement with the scanner mounting means causing said limited displacement thereof from a scanning position during engagement of the article by the gripper means.

21. The combination of claim 20 wherein the gripper means includes a body on which the scanner means is carried, a lower jaw fixed to the body, a movable jaw pivotally mounted on the body, spring means for biasing the movable jaw to a clamping position and powered actuator means for displacement of the movable jaw from said clamping position.

22. The combination of claim 20 wherein said robotic means includes first track means slidably mounting the gripper means for displacement in one direction during insertion into and retrieval of the articles from the article storing means, second and third track means slidably mounting the first track means for displacement thereof in perpendicular transport directions between the port and the article storing means and drive means operatively connected to the gripper means and the first and second track means for imparting motion to the gripper means along said one direction and said transport directions.

23. The combination of claim 22 wherein said drive means include a pair of spaced drive shafts rotatably mounted about fixed axes parallel to one of said transport directions, threaded means drivingly connecting said drive shafts to the second track for displacement thereof along said one of the transport directions and drive connecting means operatively interconnecting the drive shafts for simultaneous rotation at equal speeds.

24. In combination with a gripper and robotic transport means for displacing the gripper in a common transport plane between predetermined location and in a direction intersecting said plane at said locations, means operatively mounting the gripper on the robotic transport means for accommodating relative displacement between the gripper and the transport means at one of said predetermined locations in response to excessive resistance to movement of the gripper in said direction intersecting the common transport plane, means responsive to said relative displacement for generating a signal indicating collision of the gripper and programmed means operatively connected to the robotic transport means for effecting the displacement of the gripper from said one of the predetermined locations to another of the locations in response to said signal, a data reading scanner mounted on the gripper in a scanning position, control means operatively connected to the gripper for displacement thereof along said direction intersecting the common transport plane to reading and gripping positions and means for retracting the scanner from said scanning position thereof in response to displacement of the gripper to the gripping position.

25. The combination of claim 24 wherein the transport means includes a rotatable screw shaft, a nut engaged with the screw shaft and means connecting the mounting means to the nut for preventing rotation thereof to confine movement thereof in said direction intersection the common transport plane.

26. A machine for vending articles, comprising:

storage means for establishing a plurality of separate storage zones respectively receiving the articles in a predetermined orientation thereof, robotic means for transporting the articles to the storage zones, realigning means mounted within said storage means for engagement with articles transported thereto by said robotic means in a misaligned condition with respect to said predetermined orientation of said articles transported thereto by said robotic means for restoring said misaligned articles to said predetermined orientation thereof, means responsive to interruption in said transport of the articles to said storage zones for generating collision signals, and programmed control means operatively connected to said robotic means for effecting said transport of the articles to said realigning means and one of said storage zones in sequence in response to one of the collision signals from said signal generating means.

27. The combination of claim 26 wherein said storage means further comprises a discard zone and means associated with said programmed control means for effecting transport of articles to said discard zone in response to another of said collision signals following transport of the articles to said realigning means.

* * * * *